(12) United States Patent
Gomi

(10) Patent No.: US 9,766,125 B2
(45) Date of Patent: Sep. 19, 2017

(54) SPECTROSCOPIC CAMERA

(71) Applicant: SEIKO EPSON CORPORATION, Tokyo (JP)

(72) Inventor: Tsugio Gomi, Fujimi-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 338 days.

(21) Appl. No.: 14/185,473

(22) Filed: Feb. 20, 2014

(65) Prior Publication Data

US 2014/0240508 A1   Aug. 28, 2014

(30) Foreign Application Priority Data

Feb. 22, 2013   (JP) ................. 2013-032937

(51) Int. Cl.
  *G01J 3/28*   (2006.01)
  *G01J 3/51*   (2006.01)
  *G01J 3/02*   (2006.01)
  *G01J 3/26*   (2006.01)

(52) U.S. Cl.
  CPC ............ *G01J 3/2823* (2013.01); *G01J 3/027* (2013.01); *G01J 3/0208* (2013.01); *G01J 3/0232* (2013.01); *G01J 3/0235* (2013.01); *G01J 3/0286* (2013.01); *G01J 3/0291* (2013.01); *G01J 3/26* (2013.01); *G01J 3/513* (2013.01)

(58) Field of Classification Search
  CPC ........ G01J 3/2823; G01J 3/0232; G01J 3/513; G01J 3/027
  See application file for complete search history.

(56) References Cited

U.S. PATENT DOCUMENTS

| 4,950,077 | A |   | 8/1990 | Manabe |
| 6,137,958 | A | * | 10/2000 | Toyoda ............... G02B 27/281 |
|           |   |   |         | 396/166 |
| 2007/0064119 | A1 |   | 3/2007 | Komiya et al. |
| 2009/0021739 | A1 | * | 1/2009 | Tsujita ............... A61B 1/00163 |
|           |   |   |         | 356/407 |
| 2010/0220211 | A1 |   | 9/2010 | Komiya et al. |
| 2012/0281109 | A1 |   | 11/2012 | Komiya et al. |
| 2013/0043225 | A1 | * | 2/2013 | Schurmann .......... B23K 26/048 |
|           |   |   |         | 219/121.64 |
| 2013/0188026 | A1 | * | 7/2013 | Hiramoto ........... H04N 13/0235 |
|           |   |   |         | 348/49 |

FOREIGN PATENT DOCUMENTS

| JP | U-1-162648 | 11/1989 |
| JP | A-2001-319829 | 12/2001 |

(Continued)

*Primary Examiner* — Nam Pham
(74) *Attorney, Agent, or Firm* — Oliff PLC

(57) ABSTRACT

A spectrometry apparatus includes a light incident section on which incident light from an image pickup target is made incident, an image pickup section provided on an optical path of the incident light input from the light incident section, a variable wavelength interference filter configured to transmit light having a predetermined wavelength from the incident light input from the light incident section and capable of changing the wavelength of the light to be transmitted, and a filter-position switching section configured to advance and retract the variable wavelength interference filter to and from an optical path of the incident light.

7 Claims, 14 Drawing Sheets

(56) References Cited

FOREIGN PATENT DOCUMENTS

| JP | 2003-050159 A | 2/2003 |
| JP | 2005-167444 A | 6/2005 |
| JP | A-2005-196627 | 7/2005 |
| JP | 2005-341175 A | 12/2005 |
| JP | A-2009-264888 | 11/2009 |
| JP | A-2010-193380 | 9/2010 |
| JP | 2012-014006 A | 1/2012 |

* cited by examiner

| SPECTRAL IMAGE PICKUP WAVELENGTH | TRANSMISSION PEAK IN VISIBLE REGION | TYPES OF PHOTOELECTRIC DEVICES TO BE SELECTED | | |
|---|---|---|---|---|
| | | R | G | B |
| 1000nm | 500nm | ○ | | |
| 900nm | 450nm | ○ | | |
| 800nm | 400nm | ○ | ○ | |
| 700nm | 350nm | ○ | ○ | |
| 600nm | 300nm | ○ | ○ | ○ |

SPECTROSCOPIC CAMERA

BACKGROUND

1. Technical Field

The present invention relates to a spectroscopic camera.

2. Related Art

There has been known a spectroscopic camera that acquires color information of an object together with a color picked-up image of the object (see, for example, JP-A-2010-193380 (Patent Literature 1)).

In the apparatus described in Patent Literature 1, incident light from the object is divided into two lights by a beam splitter. One divided light is transmitted through a first filter having a wide-band transmission characteristic and subjected to image pickup by a first image pickup device. The other divided light is transmitted through a second filter having a narrow-band transmission characteristic and subjected to image pickup by a second image pickup device.

The apparatus described in Patent Literature 1 includes the first image pickup device configured to subject light transmitted through the first filter to image pickup and the second image pickup device configured to subject light transmitted through the second filter to image pickup. Therefore, it is necessary to arrange at least two image pickup devices in the apparatus. A reduction in the size of the apparatus cannot be realized.

SUMMARY

An advantage of some aspects of the invention is to provide a spectroscopic camera that can be simplified in a configuration and reduced in size.

An aspect of the invention is directed to a spectroscopic camera including: an incident optical system on which incident light from an image pickup target is made incident; a spectral filter configured to select light having a predetermined wavelength from the incident light input from the incident light system and capable of changing the wavelength of the light to be selected; a filter-position switching section configured to advance and retract the spectral filter to and from an optical path of the incident light; and an image pickup section configured to receive, with the filter-position switching section, directly or via the spectral filter, the incident light input from the incident optical system.

In the aspect of the invention, it is possible to switch, with the filter-position switching section, a state in which the spectral filter is located on the optical path of the incident light and a state in which the spectral filter is retracted from the optical path of the incident light. Therefore, it is unnecessary to provide a plurality of image pickup sections. It is possible to acquire both of a spectral image filtered via the spectral filter and a normal picked-up image not filtered via the spectral filter. It is possible to realize simplification of the configuration of the spectroscopic camera and facilitate a reduction in the size of the spectroscopic camera.

In the spectroscopic camera of the aspect of the invention, it is preferable that the filter-position switching section retracts the spectral filter from the optical path when an image in a visible wavelength region is picked up and moves the spectral filter onto the optical path when a spectral image is picked up.

In this configuration, the filter-position switching section retracts the spectral filter from the optical path when a visible light image (a color image) is picked up. Consequently, incident light (light including a visible light region) not filtered via the spectral filter reaches the image pickup section. It is possible to acquire the color image by receiving the incident light. On the other hand, the filter-position switching section moves the spectral filter onto the optical path when a spectral image is picked up. Consequently, light having a wavelength selected by the spectral filter reaches the image pickup section. It is possible to acquire a spectral image corresponding to the selected light.

In the spectroscopic camera of the aspect of the invention, it is preferable that the image pickup section includes a filter configured to transmit light in a target wavelength region of a spectral image and light in a predetermined wavelength range in a visible wavelength region and block the other lights, and the filter includes a plurality of kinds of color filters respectively having different transmission wavelength ranges in the visible wavelength region.

In this configuration, the image pickup section includes the plurality of kinds of color filters respectively having the different transmission wavelength ranges in the visible wavelength region (e.g., an R color filter configured to transmit lights in a red wavelength region and an infrared wavelength region, a G color filter configured to transmit lights in a green wavelength region and the infrared wavelength region, and a B color filter configured to transmit lights in a blue wavelength region and the infrared wavelength region). Therefore, when a color image is picked up by the spectroscopic camera, lights transmitted through the color filters are received. For example, it is possible to acquire the color image on the basis of light amount values corresponding to colors of RGB of respective pixels. On the other hand, when a spectral image is acquired from light in a target wavelength region (e.g., the infrared wavelength region) of the spectral image, the color filters also transmit lights in the target wavelength region. Therefore, light in the target wavelength region selected by the spectral filter is made incident on photoelectric devices without being blocked by the color filters. Therefore, it is possible to acquire the spectral image on the basis of a light amount value output from at least any one of a plurality of photoelectric devices in image pickup pixels or an average of light amount values output from the photoelectric devices.

As explained above, in the image pickup section in this aspect, it is possible to acquire both of the color image corresponding to the visible light wavelength region and the spectral image in the target wavelength region as picked-up images.

In the spectroscopic camera of the aspect of the invention, it is preferable that the target wavelength region of the spectral image is an infrared wavelength region or an ultraviolet wavelength region, and the color filter is an R color filter, the transmission wavelength range of which is a red wavelength region, a G color filter, the transmission wavelength range of which is the green wavelength region, and a B color filter, the transmission wavelength range of which is a blue wavelength region.

In this configuration, a measurement wavelength region is the infrared wavelength region or the ultraviolet wavelength region and the visible wavelength region is the red wavelength region, the green wavelength region, and the blue wavelength region. In this case, as explained above, when a color image is picked up, the color filters corresponding to the red wavelength region, the green wavelength region, and the blue wavelength region are used. Consequently, it is possible to easily acquire light amount values corresponding to the colors of RGB. The color filters are capable of transmitting lights in the target wavelength region such as the red wavelength region or the infrared wavelength region as well. Therefore, as explained above, it is possible to properly pick up both of the color image corresponding to the visible light region and the spectral image in the target wavelength region.

In the spectroscopic camera of the aspect of the invention, it is preferable that the spectroscopic camera includes an image acquiring section configured to acquire a picked-up image, the spectral filter is a Fabry-Perot etalon, and, when the spectral image in the target wavelength region is picked up, the image acquiring section acquires the spectral image on the basis of a signal input from a photoelectric device corresponding to a color filter, in the visible wavelength region of which a peak wavelength of a transmission spectral in the spectral filter not included in the target wavelength region of the spectral image is not included, among a plurality of photoelectric devices of image pickup pixels.

In this configuration, the Fabry-Perot etalon is used as the spectral filter. The Fabry-Perot etalon is a device in which a first reflection film and a second reflection film are arranged to be opposed to each other. The device causes lights made incident between the first reflection film and the second reflection film to interfere with each other and transmits or reflects light having a predetermined wavelength corresponding to a gap dimension between the first reflection film and the second reflection film.

In such a Fabry-Perot etalon, in general, light having mλ=2nd cos θ (where, m represents an order, n represents a refractive index of a medium between the reflection films, d represents the gap dimension between the reflection films, and θ represents an incident angle) is extracted (transmitted or reflected). For example, when incident light is made perpendicularly incident on the reflection films and a spectral image having an infrared wavelength of 800 nm as a second order peak wavelength (m=2) is acquired, light having a visible light region of 400 nm as a peak wavelength of a first order is also extracted by the Fabry-Perot etalon.

On the other hand, in this aspect, when the image acquiring section acquires a spectral image corresponding to the infrared wavelength region, the image acquiring section acquires the spectral image on the basis of a signal of a photoelectric device corresponding to a color filter (e.g., the R color filter or the G color filter), a peak wavelength of an order (e.g., light having 400 nm of a second order peak) of which different from the wavelength (e.g., 800 nm) of the spectral image is not included in a transmission visible wavelength region. Therefore, it is possible to acquire a highly accurate spectral image in which the light in the visible wavelength region is cut.

In the spectroscopic camera of the aspect of the invention, it is preferable that the spectroscopic camera includes a visible light blocking filter configured to block light in a visible wavelength region and transmit light in a target wavelength region of a spectral image, the visible light blocking filter being provided on the optical path between the incident optical system and the image pickup section, and the filter-position switching section retracts the visible light blocking filter from the optical path when an image in the visible wavelength region is picked up and moves the visible light blocking filter onto the optical path when the spectral image in the target wavelength region is picked up.

In this configuration, the spectroscopic camera further includes the visible light blocking filter. The filter-position switching section retracts the visible light blocking filter from the optical path when an image (a color image) in the visible wavelength region is picked up. Consequently, when the color image is picked up, incident light is not blocked by the visible light blocking filter. It is possible to pick up an appropriate color image. On the other hand, when a spectral image in the target wavelength region (e.g., the infrared wavelength region) is picked up, the visible light blocking filter is moved onto the optical path. Consequently, since the light in the visible light wavelength region is blocked by the visible light blocking filter, as explained above, it is unnecessary to select a photoelectric device according to the wavelength of light extracted by the variable wavelength interference filter. It is possible to easily acquire the spectral image corresponding to the target wavelength region.

In the spectroscopic camera of the aspect of the invention, it is preferable that the spectroscopic camera further includes a spectral target wavelength light blocking filter configured to transmit light in a visible wavelength region and block light in a target wavelength region of a spectral image, and the filter-position switching section retracts the spectral target wavelength light blocking filter from the optical path when the spectral image in the target wavelength region is picked up and moves the spectral target wavelength light blocking filter onto the optical path when an image in the visible wavelength region is picked up.

In this configuration, the spectroscopic camera further includes the spectral target wavelength light blocking filter. The filter-position switching section moves the spectral target wavelength light blocking filter onto the optical path when an image (a color image) in the visible wavelength region is picked up. Consequently, when the color image is picked up, it is possible to block light having a target wavelength in an infrared wavelength region or the like from incident light. Therefore, it is possible to acquire a highly accurate color image based on light amount values of wavelengths in the visible wavelength region. When an image in the infrared wavelength region such as a spectral, image in the infrared wavelength region is picked up, the spectral target wavelength light blocking filter is retracted from the optical path. Therefore, it is possible to pick up an appropriate image in the infrared wavelength region.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
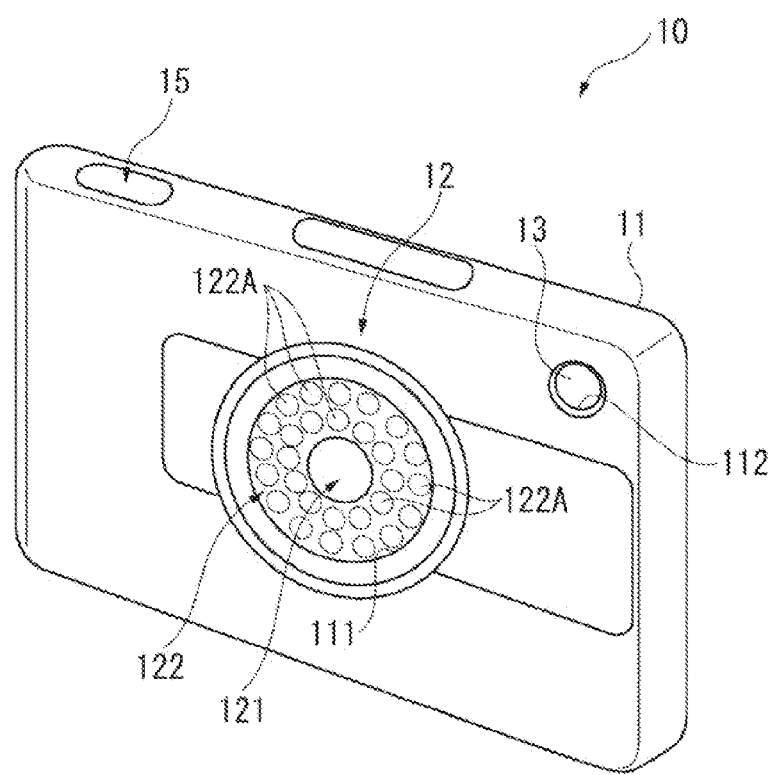
FIG. 1 is a perspective view showing the schematic configuration of a spectrometry apparatus in a first embodiment of the invention.
Figure 2:
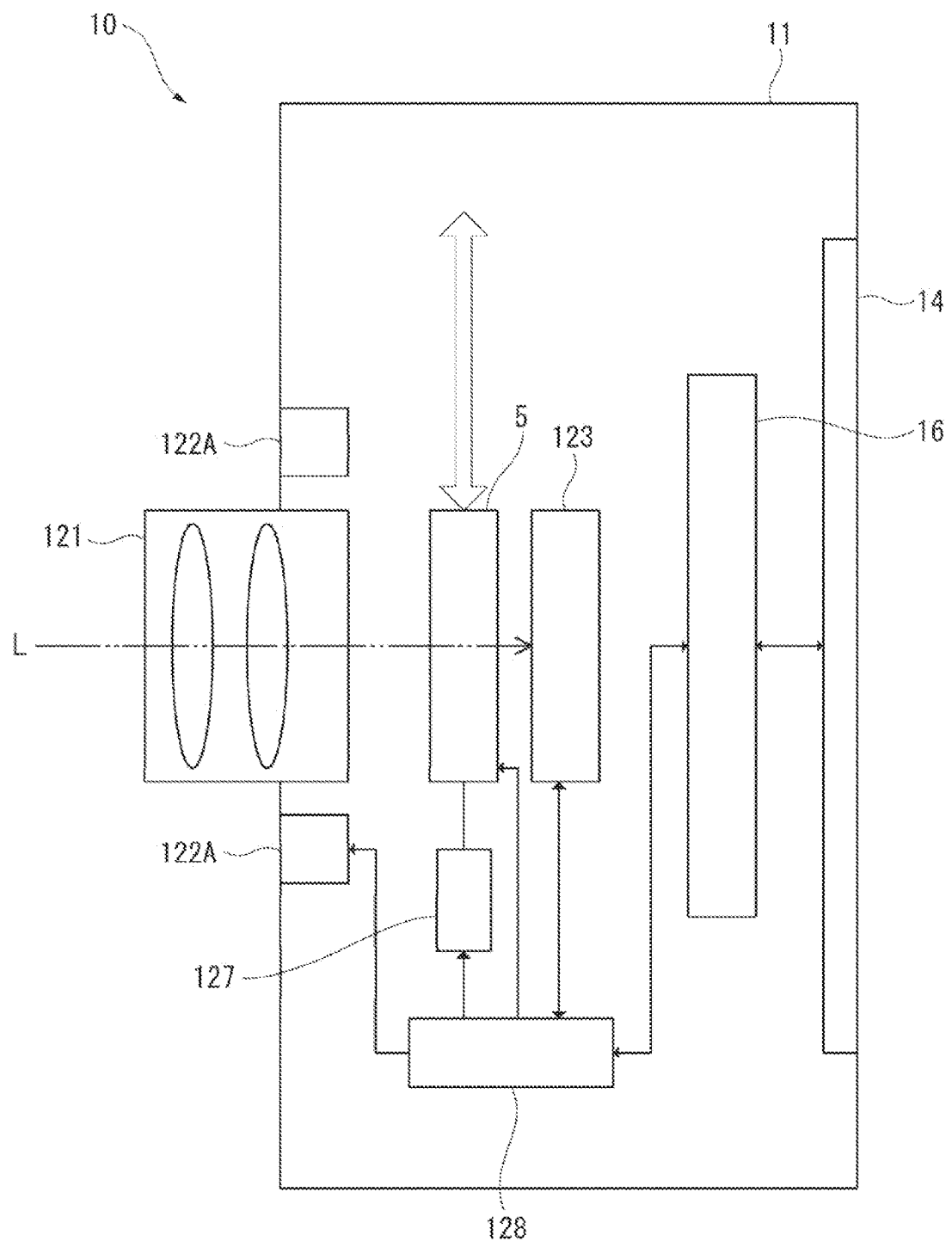
FIG. 2 is a diagram showing the schematic configuration of the spectrometry apparatus in the first embodiment.

A spectroscopic camera (a spectrometry apparatus) according to the first embodiment of the invention is explained below with reference to the drawings.
Schematic Configuration of the Spectrometry Apparatus FIG. 1 is a perspective view showing the front configuration of a spectrometry apparatus in the first embodiment. FIG. 2 is a schematic diagram showing the sectional configuration of the spectrometry apparatus.

A spectrometry apparatus 10 is a spectroscopic camera according to the invention and is an apparatus that picks up spectral images corresponding to a plurality of wavelengths of an image pickup target, analyzes a spectrum in an infrared wavelength region (a target wavelength region of the spectral images) in pixels on the basis of the spectral images, and analyzes components of the image pickup target from the analyzed spectrum. The spectrometry apparatus 10 in this embodiment has a function of acquiring a color image (an image in a visible wavelength region) of the image pickup target and causing a display 14 to display the color image on a real time basis such that a user can easily recognize the image pickup target. In this embodiment, an example of the spectrometry apparatus 10 that sets a food as the image pickup target and calculates nutrients (carbohydrates, proteins, fats, moisture, etc.) included in the food and a calorie of the food is explained below.

Figure 3:
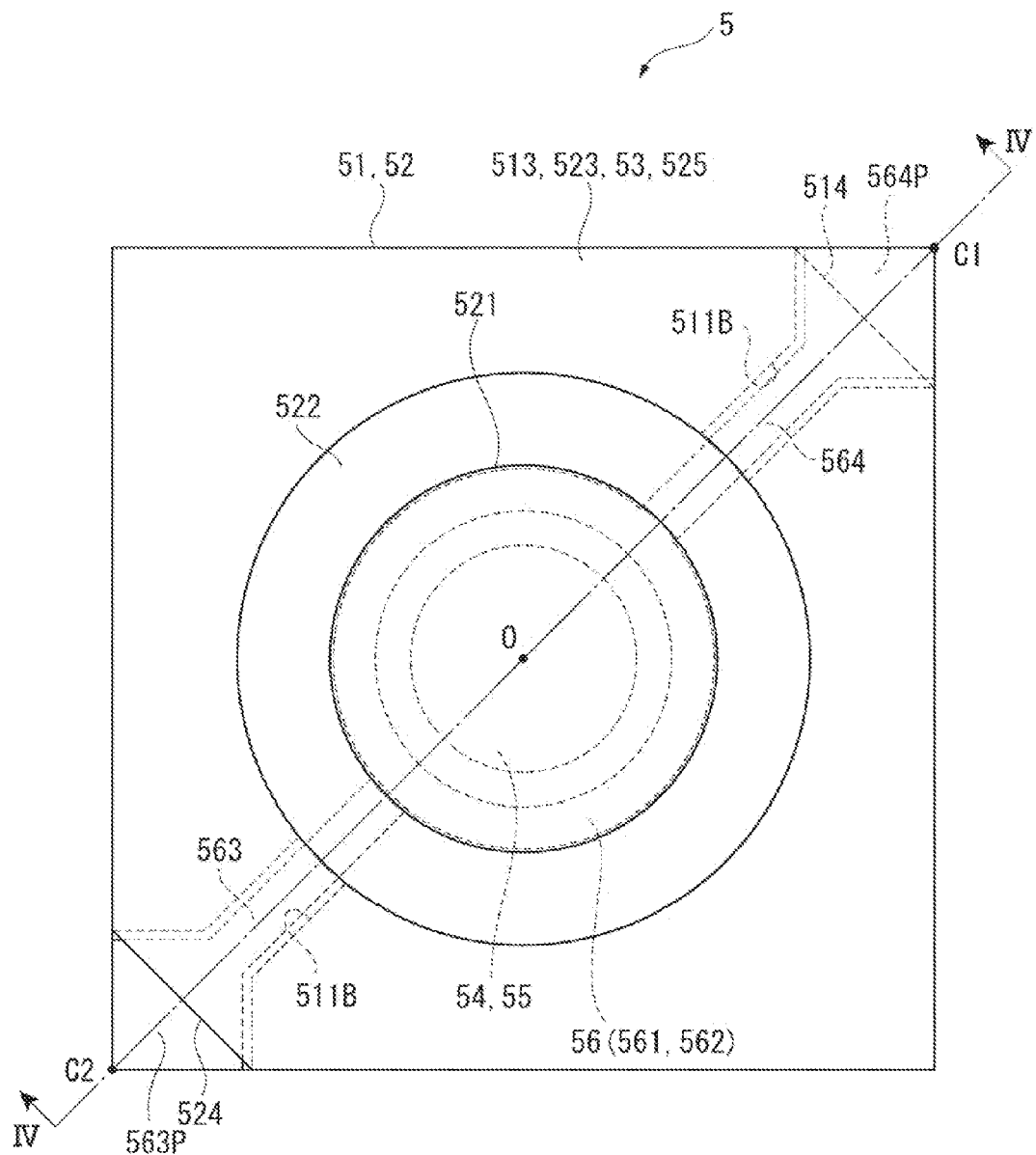
FIG. 3 is a plan view of a variable wavelength interference filter in the first embodiment.
Figure 4:
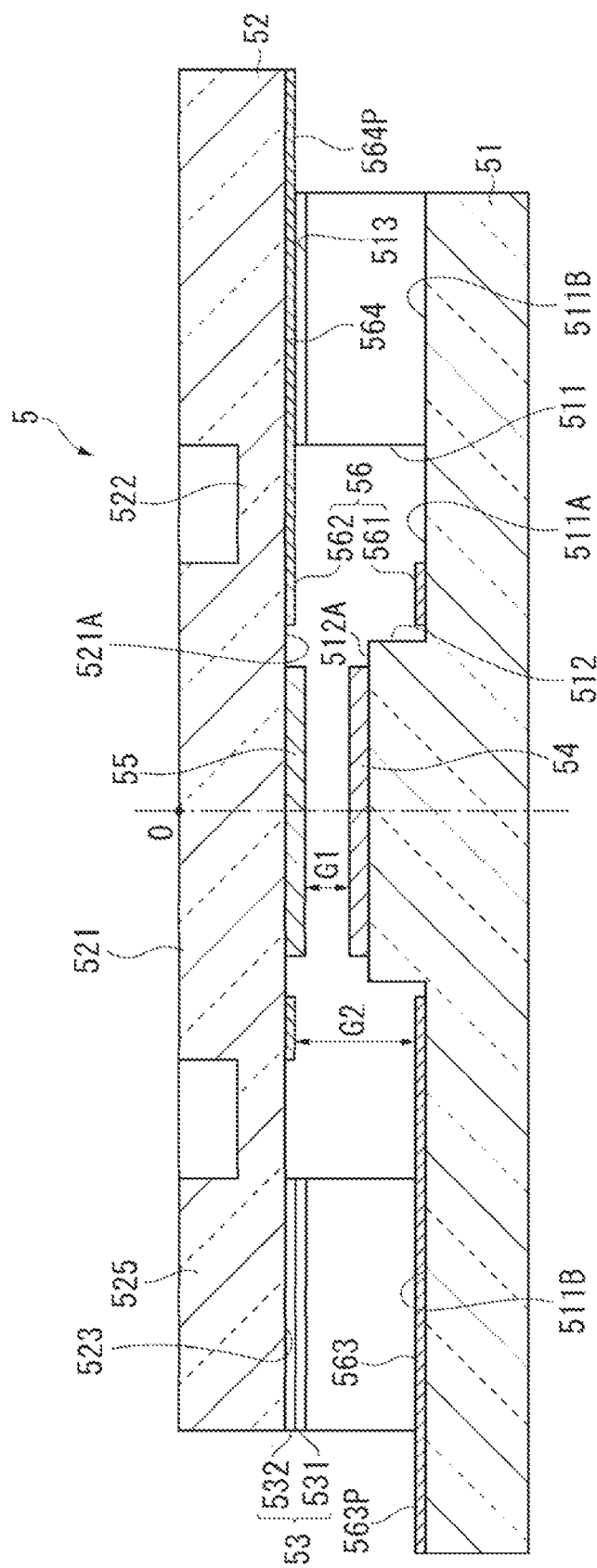
FIG. 4 is a sectional view of the variable wavelength interference filter taken along line IV-IV in FIG. 3.

The spectrometry apparatus 10 in this embodiment includes, as shown in FIGS. 1 and 2, a housing 11, an image pickup module 12, a temperature sensor 13, the display 14, an operation section 15, and a control section 16.
Configuration of the Housing The housing 11 has a thickness dimension of, for example, about 1 to 2 cm and is formed in a thin box shape that can be easily stored in a pocket or the like of clothes. The housing 11 includes an image pickup window 111 in which the image pickup module 12 is arranged and a sensor window 112 in which the temperature sensor 13 is arranged. The housing 11 includes, as shown in FIG. 2, for example, a display window, on the back side of which the display 14 is arranged. Further, the operation section 15 (e.g., a shutter button) is provided in a part of the housing 11.
Configuration of the Image Pickup Module The image pickup module 12 includes a light incident section 121 (an incident optical system) provided to face the image pickup window 111, a light source section 122 provided to face the image pickup window 111, a variable wavelength interference filter 5 (a spectral filter), an image pickup section 123 configured to receive incident light, a filter-position switching section 127, and a control board 128 (see FIG. 10).
Configuration of the Light Incident Section As shown in FIG. 2, the light incident section 121 includes a plurality of lenses and configures an incident optical system according to the invention. A viewing angle of the light incident section 121 is limited to a predetermined angle or less. The light incident section 121 images, in the image pickup section 123, an image of a test target within the viewing angle. For example, the operation section 15 is operated by a user, whereby a lens interval of a part of the plurality of lenses can be adjusted. Consequently, it is possible to enlarge and reduce an image to be acquired. In this embodiment, it is preferable to use telecentric lenses as the lenses included in the light incident section 121. The telecentric lenses can align an optical axis of incident light in a direction parallel to a principal ray and make the incident light perpendicularly incident on a fixed reflection film 54 and a movable reflection film 55 of the variable wavelength interference filter 5 explained below. When the telecentric lenses are used as the lenses included in the light incident section 121, a diaphragm is provided in a focus position of the telecentric lenses. An aperture diameter of the diaphragm is controlled by the control section 16, whereby the viewing angle can be controlled. An incident angle of the incident light limited by the lens group, the diaphragm, and the like is different depending on lens design or the like. However, it is preferable that the incident angle is limited to 20 degrees or less from the optical axis.
Configuration of the Light Source Section The light source section 122 includes, as shown in FIGS. 1 and 2, along the outer circumference of the image pickup window 111, a plurality of light sources 122A (LEDs) arranged to be arrayed in a ring shape. In this embodiment, the LEDs are illustrated as the light sources 122A. However, for example, laser light sources may be used. Since the LEDs or the laser light sources are used as the light sources 122A, it is possible to attain a reduction in the size and power saving of the light source section 122.
Configuration of the Variable Wavelength Interference Filter FIG. 3 is a plan view showing the schematic configuration of the variable wavelength filter. FIG. 4 is a sectional view of the variable wavelength interference filter taken along line IV-IV in FIG. 3.

The variable length interference filter 5 is a Fabry-Perot etalon. The variable wavelength interference filter 5 is, for example, of an optical member having a rectangular shape and includes a fixed substrate 51 formed at a thickness dimension of, for example, about 500 μm and a movable substrate 52 formed at a thickness dimension of, for example, about 200 μm. Each of the fixed substrate 51 and the movable substrate 52 is formed of any one of various kinds of glasses such as soda glass, crystalline glass, quartz glass, lead glass, potassium glass, borosilicate glass, and non-alkali glass or crystal. A first joining section 513 of the fixed substrate 51 and a second joining section 523 of the movable substrate 52 are joined by a joining film 53 (a first joining film 531 and a second joining film 532) formed by a plasma polymer film or the like containing, for example, siloxane as a main component, whereby the fixed substrate 51 and the movable substrate 52 are integrally formed.

The fixed reflection film 54 is provided on the fixed substrate 51. The movable reflection film 55 is provided on the movable substrate 52. The fixed reflection film 54 and the movable reflection film 55 are arranged to be opposed to each other via an inter-reflection film gap G1. In the variable wavelength interference filter 5, an electrostatic actuator 56 used to adjust (change) a gap amount of the inter-reflection film gap G1 is provided. The electrostatic actuator 56 includes a fixed electrode 561 provided on the fixed substrate 51 and a movable electrode 562 provided on the movable substrate 52. The fixed electrode 561 and the movable electrode 562 are opposed to each other via an inter-electrode gap G2. The fixed electrode 561 and the movable electrode 562 may be respectively directly provided on the substrate surfaces of the fixed substrate 51 and the movable substrate 52 or may be provided via other film members. A gap amount of the inter-electrode gap G2 is larger than the gap amount of the inter-reflection film gap G1.

In a filter plan view of the variable wavelength interference filter 5 viewed from the substrate thickness direction of the fixed substrate 51 (the movable substrate 52) as shown in FIG. 3, a plane center point O of the fixed substrate 51 and the movable substrate 52 coincides with a center point of the fixed reflection film 54 and the movable reflection film 55 and coincides with a center point of a movable section 521 explained below.

In the following explanation, a plan view of the variable wavelength interference filter 5 viewed from the substrate thickness direction of the fixed substrate 51 or the movable substrate 52, that is, a plan view of the variable wavelength interference filter 5 viewed from the laminating direction of the fixed substrate 51, the joining film 53, and the movable substrate 52 is referred to as filter plan view.

Configuration of the Fixed Substrate

On the fixed substrate 51, an electrode arrangement groove 513 and a reflection-film setting section 512 are formed by etching. The fixed substrate 51 is formed large in a thickness dimension compared with the movable substrate 52. A bend of the fixed substrate 51 due to electrostatic attraction generated when a voltage is applied to the fixed electrode 561 and the movable electrode 562 and internal stress of the fixed electrode 561 does not occur.

A cutout section 514 is formed at a vertex C1 of the fixed substrate 51. A movable electrode pad 564P explained below is exposed on the fixed substrate 51 side of the variable wavelength interference filter 5.

The electrode arrangement groove 511 is formed in a ring shape centering on the plane center point O of the fixed substrate 51 in the filter plan view. The reflection-film setting section 512 is formed to project to the movable substrate 52 side from the center of the electrode arrangement groove 511 in the plan view. A groove bottom surface of the electrode arrangement groove 511 is an electrode setting surface 511A on which the fixed electrode 561 is arranged. A projecting distal end face of the reflection-film setting section 512 is a reflection film setting surface 512A.

On the fixed substrate 51, an electrode extraction groove 511B extending from the electrode arrangement groove 511 toward the vertex C1 and a vertex C2 of the outer peripheral edge of the fixed substrate 51 is provided.

The fixed electrode 561 is provided on the electrode setting surface 511A of the electrode arrangement groove 511. More specifically, the fixed electrode 561 is provided in a region of the electrode setting surface 511A opposed to the movable electrode 562 of the movable section 521 explained below. On the fixed electrode 561, an insulating film for securing insulation between the fixed electrode 561 and the movable electrode 562 may be laminated.

On the fixed substrate 51, a fixed extraction electrode 563 extending from the outer circumferential edge of the fixed electrode 561 in the vertex C2 direction is provided. An extending distal end portion (a portion located at the vertex C2 of the fixed substrate 51) of the fixed extraction electrode 563 forms a fixed electrode pad 563P connected to the control board 128.

In this embodiment, one fixed electrode 561 is provided on the electrode setting surface 511A. However, for example, a configuration in which two electrodes forming concentric circles centering on the plane center point O (a double electrode configuration) may be adopted.

As explained above, the reflection-film setting section 512 is formed coaxially with the electrode arrangement groove 511 and in a substantially columnar shape having a diameter dimension smaller than the diameter dimension of the electrode arrangement groove 511. The reflection-film setting section 512 includes the reflection film setting surface 512A opposed to the movable substrate 52 of the reflection-film setting section 512.

In the reflection-film setting section 512, as shown in FIG. 4, the fixed reflection film 54 is set. As the fixed reflection film 54, for example, a metal film of Ag or the like or an alloy film of an Ag alloy or the like can be used. For example, a dielectric multilayer film including $TiO_2$ as a high refraction layer and $SiO_2$ as a low refraction layer may be used. Further, for example, a reflection film formed by laminating a metal film (or an alloy film) on the dielectric multilayer film, a reflection film formed by laminating the dielectric multilayer film on the metal film (or the alloy film), or a reflection film formed by laminating a single refraction layer ($TiO_2$, $SiO_2$, etc.) and the metal film (or the alloy film) may be used.

On a light incident surface (a surface on which the fixed reflection film 54 is not provided) of the fixed substrate 51, am antireflection film may be formed in a position corresponding to the fixed reflection film 54. The antireflection film can be formed by alternately laminating a low refractive index film and a high refractive index film. The antireflection film reduces the reflectance of visible light on the surface of the fixed substrate 51 and increases the transmittance of the visible light.

In the surface of the fixed substrate 51 opposed to the movable substrate 52, a surface on which the electrode arrangement groove 511, the reflection-film setting section 512, and the electrode extraction groove 511B are not formed by etching configures the first joining section 513. The first joining film 531 is provided in the first joining section 513 and the first joining film 531 is joined to the second joining film 532 provided on the movable substrate 52, whereby, as explained above, the fixed substrate 51 and the movable substrate 52 are joined.

Configuration of the Movable Substrate

The movable substrate 52 includes, in the filter plan view shown in FIG. 3, the movable section 521 having a circular shape centering on the plane center point O, a holding section 522 coaxial with the movable section 521 and for holding the movable section 521, and a substrate outer peripheral section 525 provided on the outer side of the holding section 522.

On the movable substrate 52, as shown in FIG. 3, a cutout section 524 is formed to correspond to the vertex C2. The fixed electrode pad 563P is exposed when the variable wavelength interference filter 5 is viewed from the movable substrate 52 side.

The movable section 521 is formed at a thickness dimension larger than the thickness dimension of the holding section 522. For example, in this embodiment, the movable section 521 is formed at a dimension same as the thickness dimension of the movable substrate 52. The movable section 521 is formed at a diameter dimension larger than at least the diameter dimension of the outer circumferential edge of the reflection-film setting surface 512A in the filter plan view. The movable electrode 562 and the movable reflection film 55 are provided in the movable section 521.

As in the fixed substrate 51, an antireflection film may be formed on the surface of the movable section 521 on the opposite side of the fixed substrate 51. Such an antireflection film can be formed by alternately laminating a low refractive index film and a high refractive index film. The antireflection film can reduce the reflectance of visible light on the surface of the movable substrate 52 and increase the transmittance of the visible light.

The movable electrode 562 is opposed to the fixed electrode 561 via the inter-electrode gap G2 and formed in a ring shape same as the shape of the fixed electrode 561. On the movable substrate 52, a movable extraction electrode 564 extending from the outer circumferential edge of the movable electrode 562 toward the vertex C1 of the movable substrate 52 is provided. An extending distal end portion (a portion located at the vertex C1 of the movable substrate 52) of the movable extraction electrode 564 configures the movable electrode pad 564P connected to the control board 128.

The movable reflection film 55 is provided in the center of a movable surface 521A of the movable section 521 to be opposed to the fixed reflection film 54 via the inter-reflection film gap G1. As the movable reflection film 55, a reflection film having the same configuration as the fixed reflection film 54 is used.

In the example explained in this embodiment, as explained above, the gap amount of the inter-electrode gap G2 is larger than the gap amount of the inter-reflection film gap G1. However, the gap amounts are not limited to this. For example, when an infrared ray or a far-infrared ray is used as measurement target light, depending on a wavelength region of the measurement target light, the gap amount of the inter-reflection film gap G1 may be larger than the gap amount of the inter-electrode gap G2.

The holding section 522 is a diaphragm surrounding the movable section 521 and is formed at a thickness dimension smaller than the thickness dimension of the movable section 521. The holding section 522 bends more easily than the movable section 521. The movable section 521 can be displaced to the fixed substrate 51 side with slight electrostatic attraction. When the movable section 521 is displaced, since the movable section 521 has the thickness dimension larger than the thickness dimension of the holding section 522 and has large rigidity, even when the holding section 522 is attracted to the fixed substrate 51 side by the electrostatic attraction, a shape change of the movable section 521 does not occur. Therefore, a bend of the movable reflection film 55 provided in the movable section 521 does not occur either. The fixed reflection film 54 and the movable reflection film 55 can be always maintained in a parallel state.

In this embodiment, the holding section 522 having a diaphragm shape is illustrated. However, the holding section 522 is not limited to this. For example, beam-like holding sections arranged at an equal angle interval may be provided centering on the plane center point O.

As explained above, the substrate outer peripheral section 525 is provided on the outer side of the holding section 522 in the filter plan view. The surface of the substrate outer peripheral section 525 opposed to the fixed substrate 51 includes the second joining section 523 opposed to the first joining section 513. The second joining film 532 is provided in the second joining section 523. As explained above, the second joining film 532 is joined to the first joining film 531, whereby the fixed substrate 51 and the movable substrate 52 are joined.

Configuration of the Image Pickup Section

Figure 5:
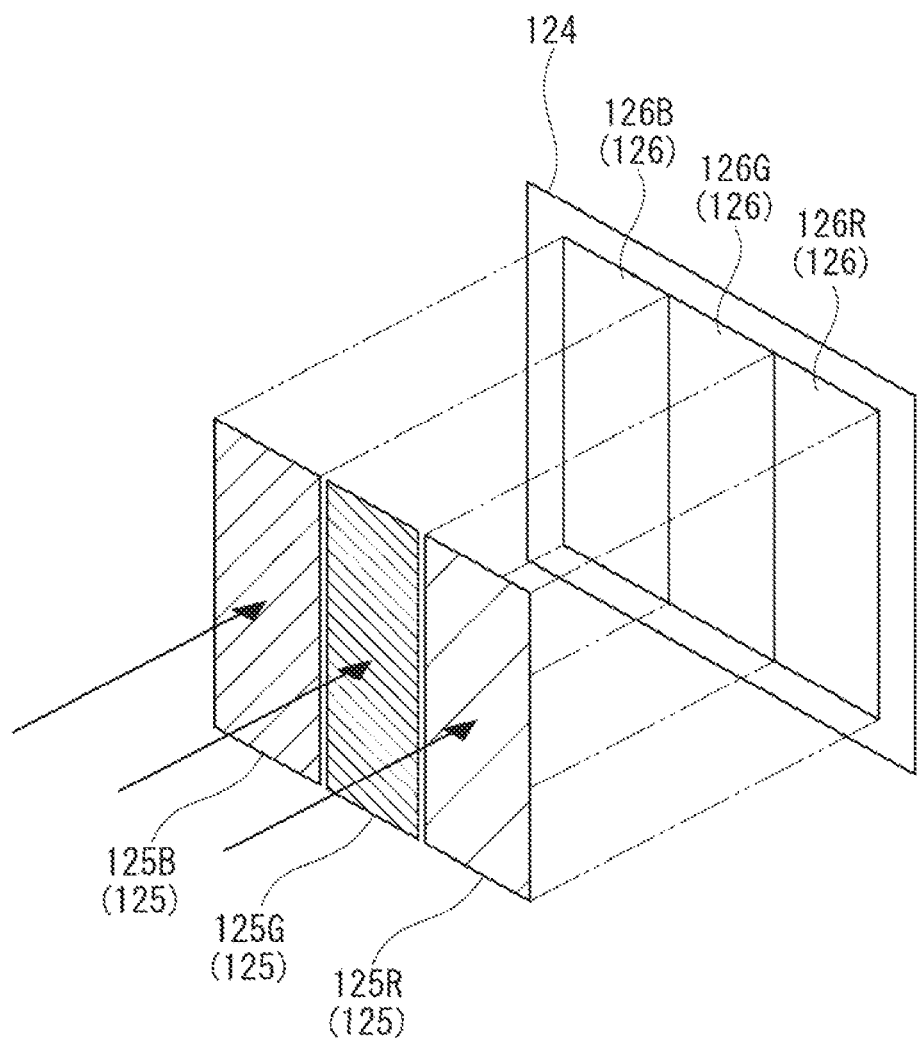
FIG. 5 is a diagram showing the schematic configuration of one image pickup pixel in an image pickup section in the first embodiment.

As the image pickup section 123, for example, an image sensor such as a CCD or a CMOS can be used. Specifically, a plurality of image pickup pixels 124 shown in FIG. 5 are provided in the image pickup section 123. The image pickup section 123 is configured by arranging the image pickup pixels 124 in an array shape.

FIG. 5 is a diagram showing the schematic configuration of one pixel (image pickup pixel) in the image pickup section.

Each of the image pickup pixels 124 includes, as shown in FIG. 5, three kinds of color filters 125 (an R color filter 125R, a G color filter 125G, and a B color filter 125B) and three photoelectric devices 126 (an R photoelectric device 126R, a G photoelectric device 126G, and a B photoelectric device 126B). A filter according to the invention is configured by the three kinds of color filters 125.

Figure 6:
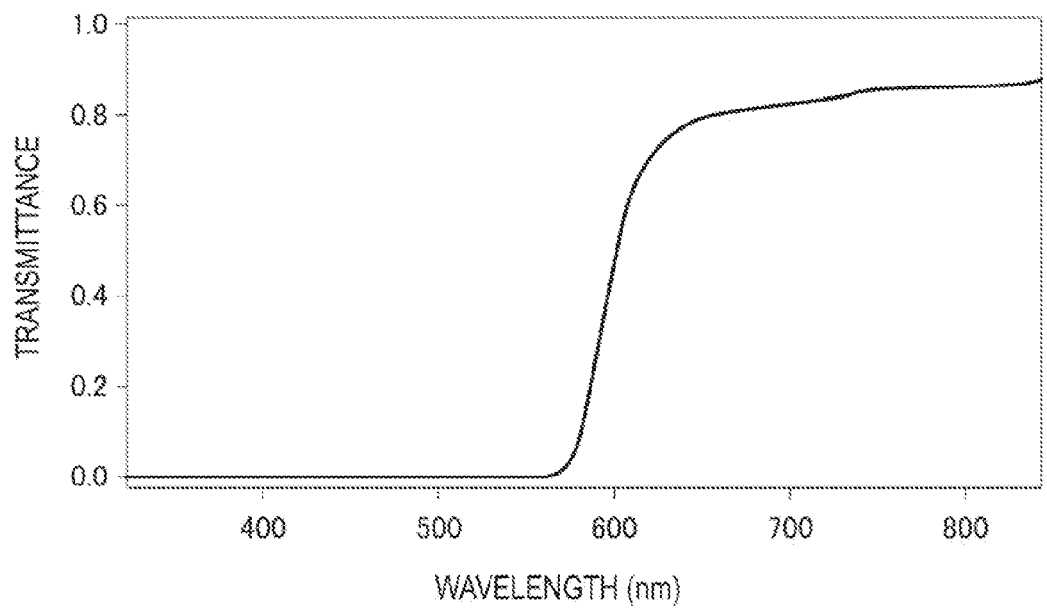
FIG. 6 is a diagram showing an example of a transmission characteristic of an R color filter in the first embodiment.
Figure 7:
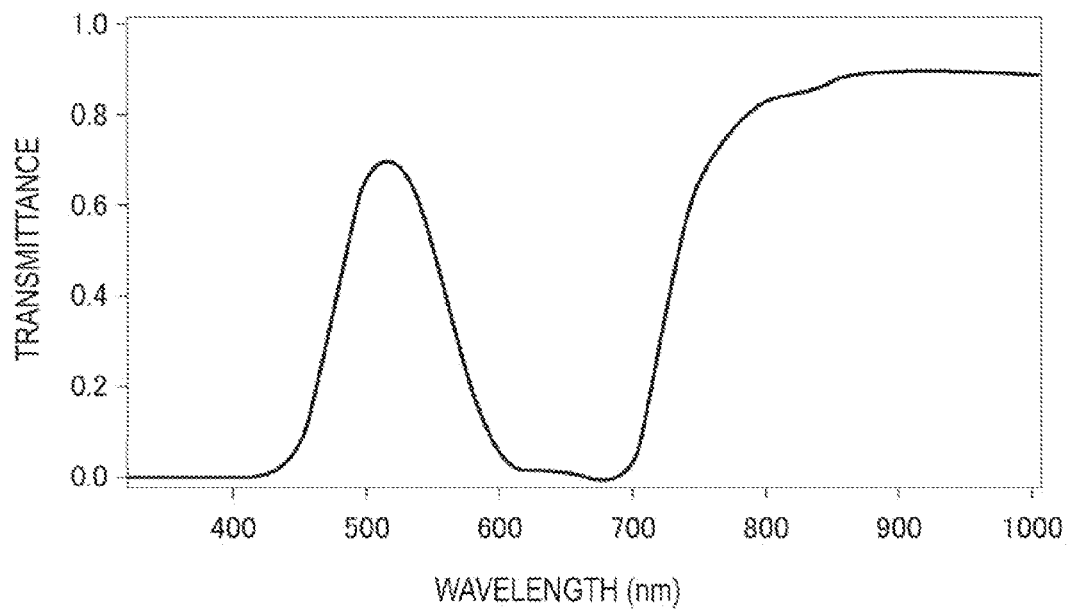
FIG. 7 is a diagram showing an example of a transmission characteristic of a G color filter in the first embodiment.
Figure 8:
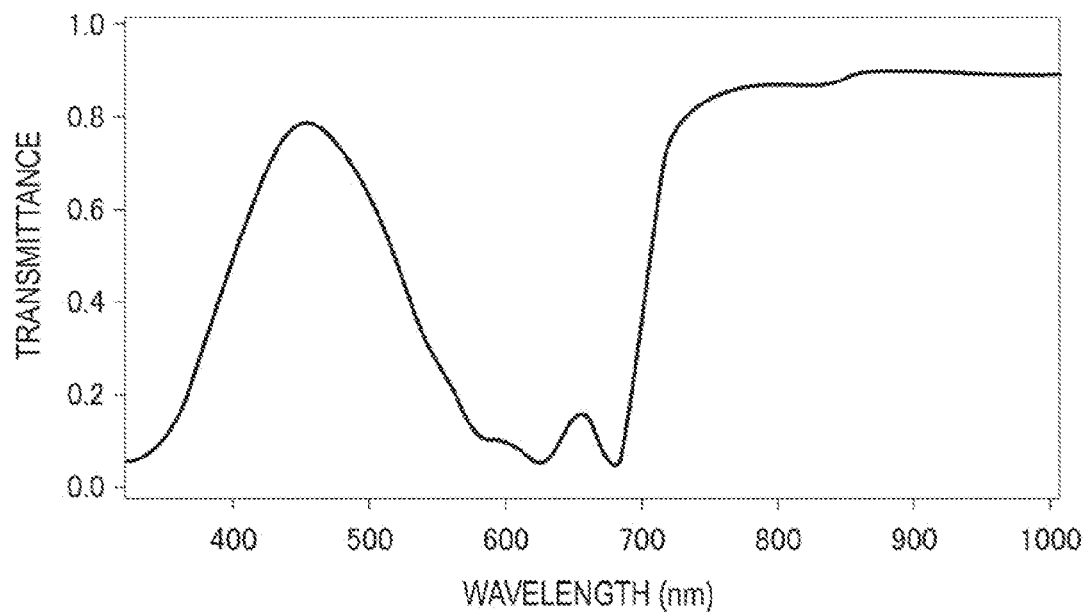
FIG. 8 is a diagram showing an example of a transmission characteristic of a B color filter in the first embodiment.
Figure 9:
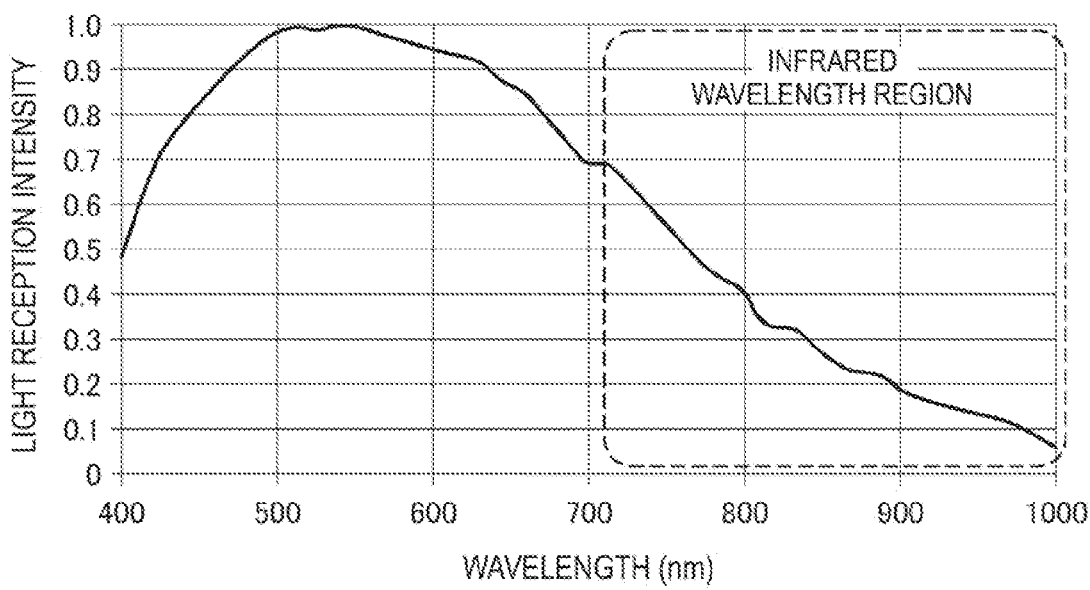
FIG. 9 is a diagram showing an example of a light receiving characteristic of photoelectric devices in the first embodiment.

FIG. 6 is a diagram showing an example of a transmission characteristic of the R color filter 125R. FIG. 7 is a diagram showing an example of a transmission characteristic of the G color filter 125G. FIG. 8 is a diagram showing an example of a transmission characteristic of the B color filter 125B. FIG. 9 is a diagram showing a light reception characteristic of the photoelectric devices 126.

As shown in FIG. 6, the R color filter 125R transmits light having a wavelength equal to or larger than a red wavelength region (e.g., light having a wavelength equal to or larger than 580 nm) and blocks lights in the other wavelength regions. That is, the R color filter 125R transmits lights in a red visible wavelength region and the infrared wavelength region. The R photoelectric device 126R is arranged to be opposed to the R color filter 125R. The R photoelectric device 126R receives light transmitted through the R color filter 125R and outputs a signal corresponding to an amount of the light.

As shown in FIG. 7, the G color filter 125G transmits light in a green wavelength region (e.g., a wavelength region in a predetermined range having a peak near 510 nm) and light in the infrared wavelength region (e.g., a wavelength region equal to or larger than 700 nm) and blocks lights in the other wavelength regions. The G photoelectric device 126G is arranged to be opposed to the G color filter 125G. The G photoelectric device 126G receives light transmitted through the G color filter 125G and outputs a signal corresponding to an amount of the light.

As shown in FIG. 8, the B color filter 125B transmits light in a blue wavelength region (e.g., a wavelength region in a predetermined range having a peak near 450 nm) and light in the infrared wavelength region (e.g., the wavelength region equal to or larger than 700 nm) and blocks lights in the other wavelength regions. The B photoelectric device 126B is arranged to be opposed to the B color filter 125B. The B photoelectric device 126B receives light transmitted through the B color filter 125B and outputs a signal corresponding to an amount of the light.

Each of the photoelectric devices 126 (photodiodes) are devices having a light reception sensitivity characteristic ranging from the visible wavelength region to the infrared wavelength region. The photoelectric device 126 receives light in a wavelength region where the photoelectric device 126 has a sensitivity characteristic and outputs a signal corresponding to an amount of the light.

In the example shown in FIG. 5, one pixel is formed at a ratio of R:G:B=1:1:1. However, one pixel may be formed at a ratio of, for example, R:G:B=1:2:1. Further, for example, so-called Bayer pixel arrangement in which the color filter 125 of any one of the colors of RGB is arranged in one image pickup pixel 124 may be adopted.

Configuration of the Filter-Position Switching Section

The filter-position switching section 127 advances and retracts the variable wavelength interference filter 5 to and from an optical path L of incident light made incident from the light incident section 121.

As the filter-position switching section 127, any configuration may be used as long as a filter arrangement state in which the variable wavelength interference filter 5 is located on the optical path L and a retracted state in which the variable wavelength interference filter 5 is retracted from the optical path L can be switched.

For example, the filter-position switching section 127 includes a filter holding section configured to hold the variable wavelength interference filter 5 and a rail member configured to guide movement of the filter holding section in one direction. The filter holding section is advanced and retracted along a rail by a driving unit such as a motor.

As another configuration example, two through-holes may be provided in a rotating plate and the variable wavelength interference filter 5 may be attached to one of the through-holes. In this case, a state in which the variable wavelength interference filter 5 is located on the optical path L and a state in which the through-hole not provided with the variable wavelength interference filter 5 is located on the optical path L can be switched by rotating the rotating plate.

Besides, the filter holding section configured to hold the variable wavelength interference filter may be turned and retracted from the optical path L by a driving force of the motor.

Configuration of the Control Board

The control board 128 is a circuit board for controlling the operation of the image pickup module 12. The control board 128 is connected to the light incident section 121, the light source section 122, the variable wavelength interference filter 5, the image pickup section 123, the filter-position switching section 127, and the like. The control board 128 controls the operations of the components on the basis of a control signal input from the control section 16. For example, when a color image is picked up, the control board 128 controls the filter-position switching section 127, retracts the variable wavelength interference filter 5 from the optical path L, and outputs a color image (a color image signal) picked up by the image pickup section 123 to the control section 16. When zooming operation is performed by the user, the control board 128 moves a predetermined lens of the light incident section 121 and changes an aperture diameter of the diaphragm. When operation for carrying out image pickup of a spectral image of an image pickup target is performed for a component analysis, the control board 128 controls lighting and extinguishing of the light sources 122A of the light source section 122 on the basis of a control signal input from the control section 16. Further, the control board 128 controls the filter-position switching section 127 and moves the variable wavelength interference filter 5 onto the optical path L. The control board 128 applies a predetermined voltage based on the control signal input from the control section 16 to the electrostatic actuator 56 of the variable wavelength interference filter 5 and outputs a spectral image (a spectral image signal) picked up by the image pickup section 123 to the control section 16.

Configuration of the Temperature Sensor

The temperature sensor 13 is arranged to face the sensor window 112 of the housing 11 and detects the temperature of a test target. As the temperature sensor 13, for example, a thermopile array or a non-contact bolometer can be used.

Configuration of the Display

The display 14 is provided to face the display window of the housing 11. The display 114 may have any configuration as long as an image can be displayed. For example, a liquid crystal panel and an organic EL panel can be illustrated.

The display 14 in this embodiment is used as a touch panel as well. The display 14 also functions as a kind of the operation section 15.

Configuration of the Operation Section

As explained above, the operation section 15 includes a shutter button provided in the housing 11 and a touch panel provided on the display 14. When input operation by the user is performed, the operation section 15 outputs an operation signal corresponding to the input operation to the control section 16. The operation section 15 is not limited to the configuration. For example, a plurality of operation buttons or the like may be provided instead of the touch panel.

Configuration of the Control Section

Figure 10:
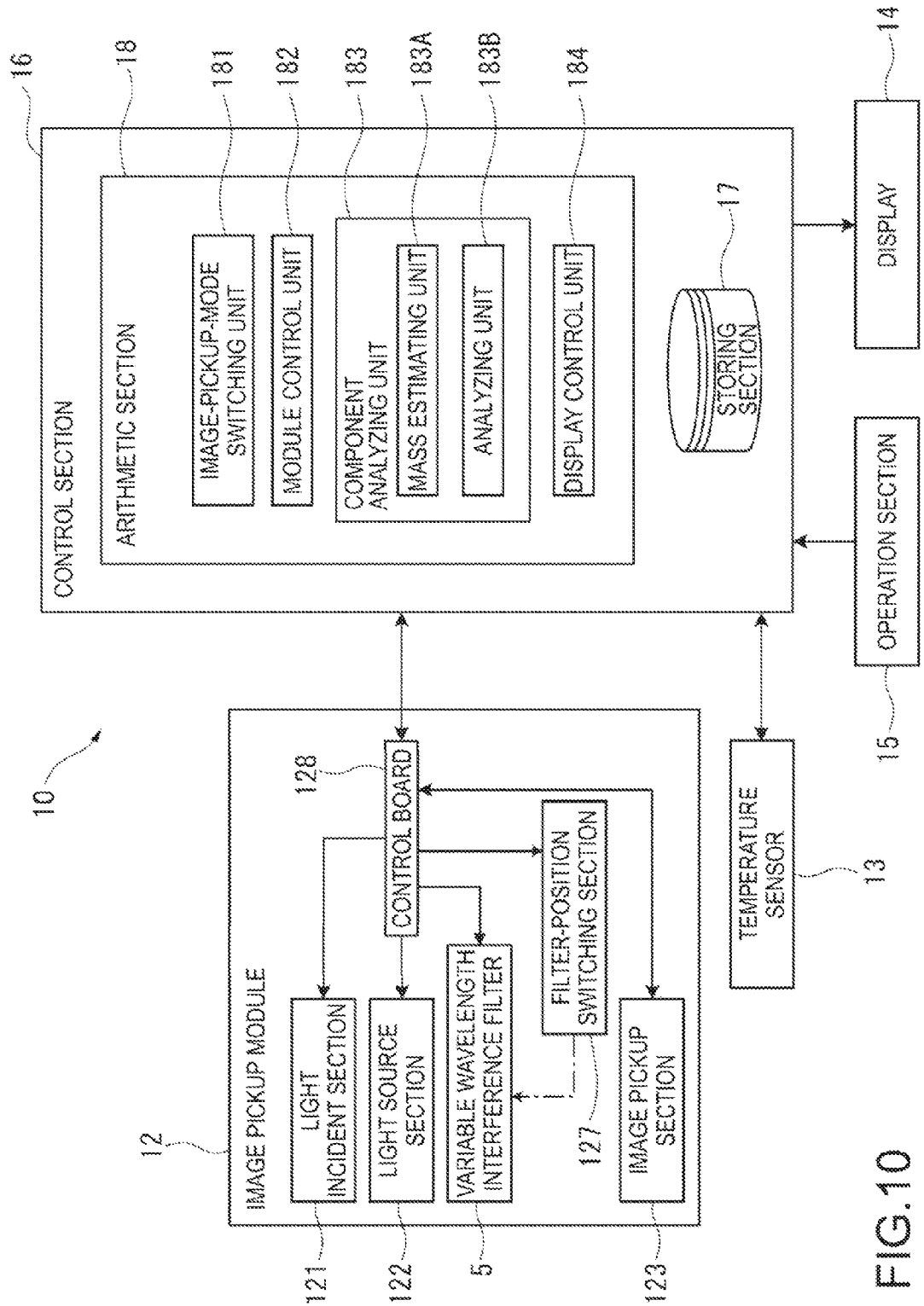
FIG. 10 is a block diagram showing the schematic configuration of the spectrometry apparatus in the first embodiment.

FIG. 10 is a block diagram showing the schematic configuration of the spectrometry apparatus 10.

The control section 16 is configured by combining, for example, a CPU and a memory and controls the overall operation of the spectrometry apparatus 10. The control section 16 includes, as shown in FIG. 10, a storing section 17 (a storing unit) and an arithmetic section 18.

In the storing section 17, an OS for controlling the overall operation of the spectrometry apparatus 10, computer programs for realizing various functions, and various data are stored. The storing section 17 includes a temporary storage area for temporarily storing an acquired spectral image or color image, a component analysis result, and the like.

In the storing section 17, V-λ data indicating a relation of a wavelength of light transmitted through the variable wavelength interference filter 5 with respect to a driving voltage applied to the electrostatic actuator 56 of the variable wavelength interference filter 5 is stored.

In the storing section 17, correction values of absorption spectra of components with respect to temperatures are stored.

Further, in the storing section 17, correlation data (e.g., a calibration curve) indicating a correlation between a feature value (a light absorption degree at a specific wavelength) extracted from absorption spectra for components of an analysis target and a component content ratio is stored.

The arithmetic section 18 reads a computer program stored in the storing section 17 to execute various kinds of processing and functions as an image-pickup-mode switching unit 181, a module control unit 182, a component analyzing unit 183, and a display control unit 184.

The image-pickup-mode switching unit 181 switches, on the basis of operation by the user, a color image pickup mode for picking up a color image in the visible wavelength region with the image pickup module 12 and a spectral image pickup mode for picking up a spectral image in the infrared wavelength region with the image pickup module 12.

The module control unit 182 controls the image pickup module 12. Specifically, in the color image pickup mode, the module control unit 182 outputs, to the control board 128, a control signal for retracting the variable wavelength interference filter 5 from the optical path L and acquires a color image acquired by the image pickup section 123. In the spectral image pickup mode, the module control unit 182 outputs, to the control board 128, a control signal for moving the variable wavelength interference filter 5 onto the optical path L. Further, the module control unit 182 controls the electrostatic actuator 56 on the basis of the V-?data stored in the storing section 17 and acquires a spectral image at every predetermined wavelength interval. That is, the module control unit 182 functions as an image acquiring section according to the invention configured to acquire a picked-up image picked up by the image pickup section 123.

The component analyzing unit 183 calculates components (nutrients and contents of the nutrients) included in an image pickup target food and a calorie of the food on the basis of spectral images at wavelengths acquired according to the control by the module control unit 182.

Specifically, the component analyzing unit 183 includes a mass estimating unit 183A and an analyzing unit 183B.

The mass estimating unit 183A estimates volume of a measurement target food on the basis of a picked-up image and estimates mass on the basis of the calculated volume. In an example explained in this embodiment, the mass is estimated by the mass estimating unit 183A. However, for example, a digital scale or the like may be provided in a part of the spectrometry apparatus 10. Mass measured by the digital scale may be acquired.

The analyzing unit 183E calculates a light absorption degree from light amounts of pixels of an acquired spectral image, calculates content ratios and contents of the nutrients and a calorie of the food using the correlation data stored in the storing section 17, and stores the content ratios, the contents, and the calorie in the storing section 17 as food nutrition data in association with date and time when the measurement is carried out.

When the image pickup module 12 is controlled by the module control unit 182 and a picked-up image is acquired, the display control unit 184 causes the display 14 to display the acquired picked-up image. The display control unit 184 causes the display 14 to display a component analysis result calculated by the component analyzing unit 183.

Specific processing by the arithmetic section 18 is explained below.

Operation of the Spectrometry Apparatus

The operation by the spectrometry apparatus 10 explained above is explained below with reference to the drawings.

When a component analysis is carried out by the spectrometry apparatus 10 in this embodiment, first, initial processing for acquiring a reference received light amount for calculating a light absorption degree is carried out. The initial processing is carried out when image pickup is applied to a reference calibration plate such as a white plate. Received light amounts $I_0$ at wavelengths are measured. Specifically, the arithmetic section 18 switches, with the image-pickup-mode switching unit 181, an image pickup mode to the spectral image pickup mode, sequentially switches, with the module control unit 182, a voltage applied to the electrostatic actuator 56, and switches a transmission wavelength at an interval of, for example, 10 nm with respect to a predetermined near-infrared wavelength region (e.g., 700 nm to 1500 nm). The arithmetic section 18 detects received lights amount corresponding to wavelengths with the image pickup section 123 and stores the received light amounts in the storing section 17. Details concerning the photoelectric devices 126 used when a spectral image is acquired are explained below in explanation of acquisition processing (step S7) for a spectral image.

The arithmetic section 18 may set a received light amount at only one point of the reference calibration plate as the reference received light amount or may specify a pixel range of the reference calibration plate among spectral images and calculate an average of received light amounts in a predetermined number of pixels or all pixels within the specified pixel range.

Figure 11:
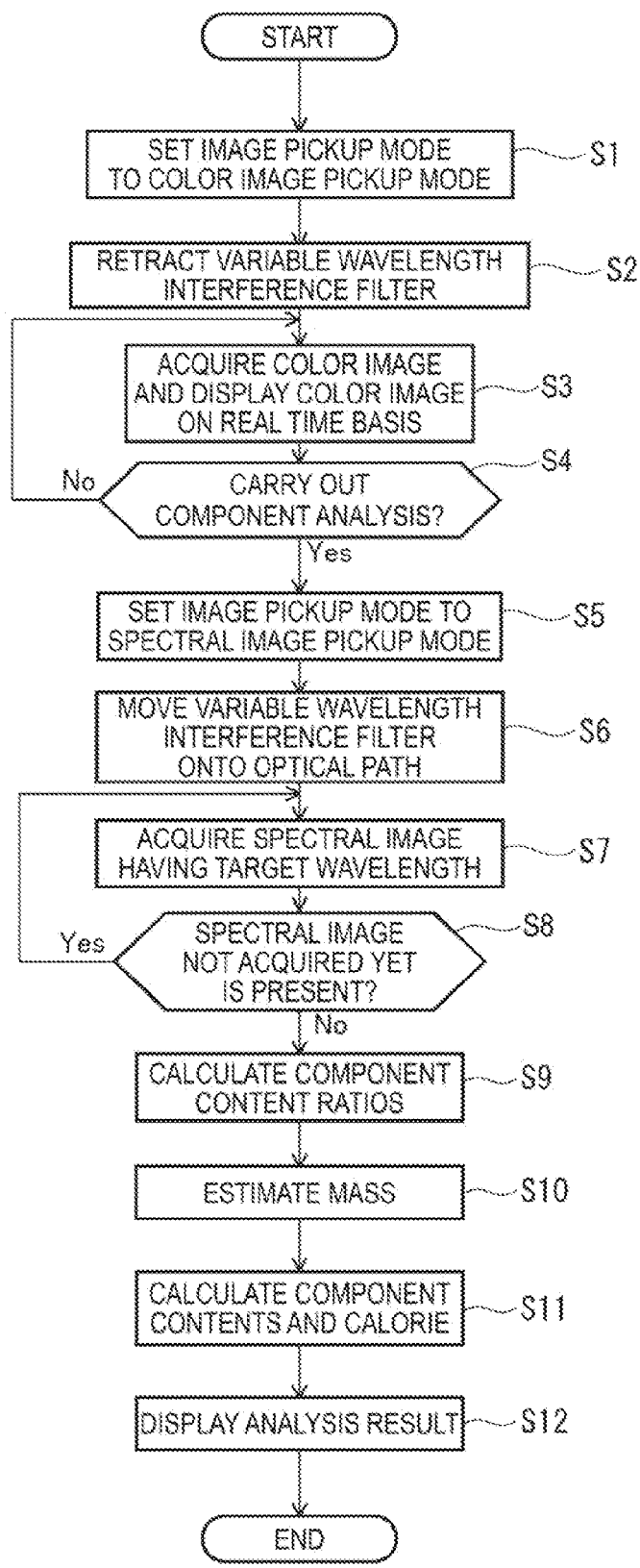
FIG. 11 is a flowchart for explaining component analysis processing by the spectrometry apparatus in the first embodiment.

Processing for carrying out a component analysis of an image pickup target actually using the spectrometry apparatus 10 is explained with reference to FIG. 11. FIG. 11 is a flowchart for explaining the component analysis processing by the photometry apparatus 10.

As shown in FIG. 11, when the component analysis processing is carried out, an image pickup target (a food) is set as an object of the spectrometry apparatus 10. When the spectrometry apparatus 10 is started, as initial setting, the image-pickup-mode switching unit 181 switches the image pickup mode to the color image pickup mode (step S1).

Figure 12:
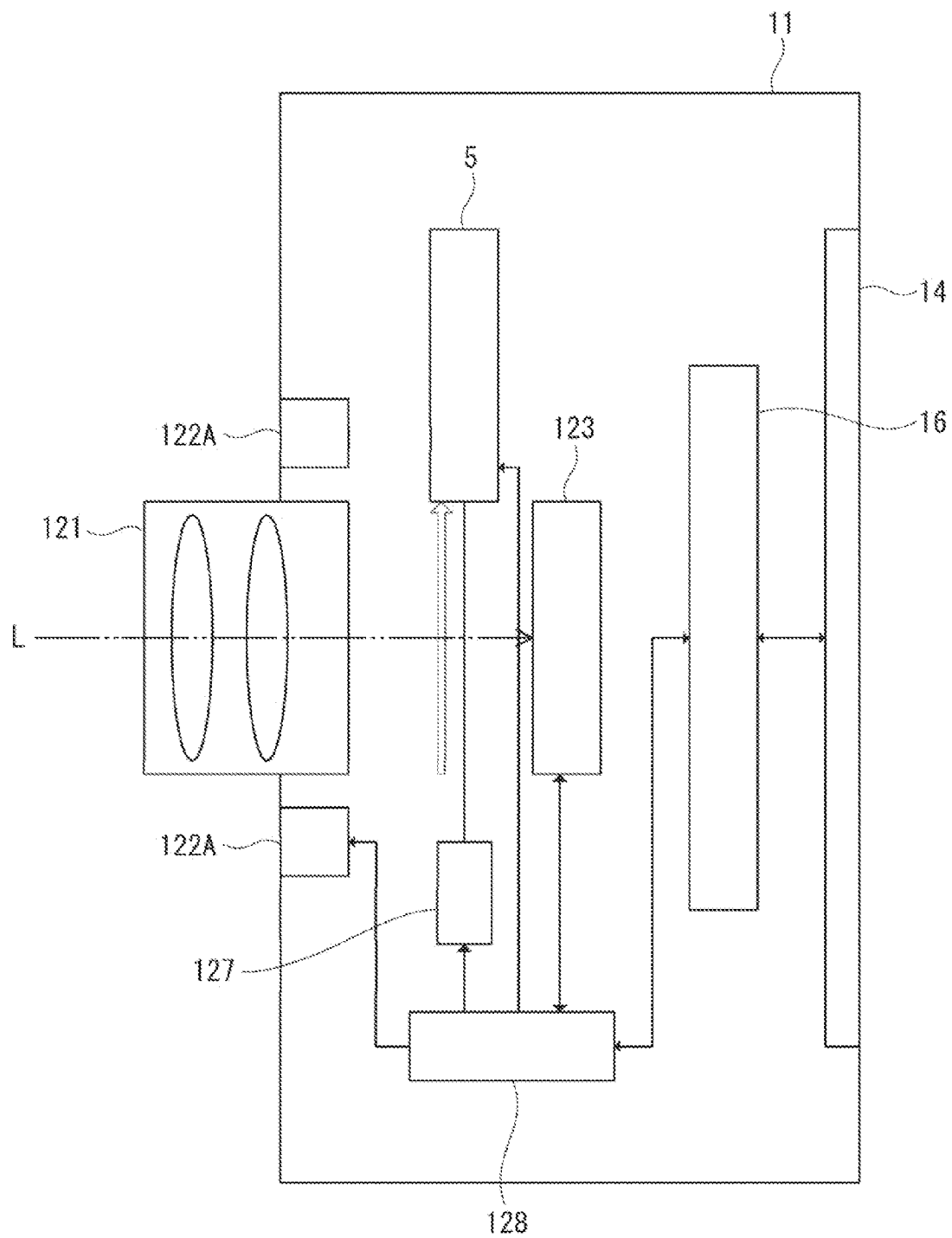
FIG. 12 is a diagram showing a state in which the variable wavelength interference filter is retracted in the spectrometry apparatus in the first embodiment.

Consequently, the module control unit 182 outputs a control signal to the control board 128. As shown in FIG. 12, the filter-position switching section 127 retracts the variable wavelength interference filter 5 to a retracted position from the optical path L (step S2).

Therefore, incident light from the incident optical system is received by the image pickup section 123 without passing through the variable wavelength interference filter 5. Signals from the photoelectric devices 126 of the image pickup section 123 are input to the control section 16 via the control board 128. The module control unit 182 acquires a color picked-up image on the basis of the signals (light amount values) of the photoelectric devices 126 of the image pickup pixels 124. The display control unit 184 causes the display 14 to display the color picked-up image on a real time basis (step S3).

For example, the control section 16 determines whether operation for carrying out a component analysis of the image pickup target is carried out by operation of the operation section 15 by the user such as pressing of a shutter (step S4).

When the operation by the user is not performed in step S4, the spectrometry apparatus 10 returns to step S3 and continues the real time display of the color image of the image pickup target. On the other hand, when it is determined in step S4 that the operation for carrying out the component analysis of the image pickup target is carried out, the image-pickup-mode switching unit 181 sets the image pickup mode to the spectral image pickup mode (step S5). Consequently, the module control unit 182 outputs a control signal to the control board 128. As shown in FIG. 2, the filter-position switching section 127 moves the variable wavelength interference filter 5 onto the optical path L (step S6).

Thereafter, the module control unit 182 outputs, referring to the V-λ data stored in the storing section 17, a control signal for driving the variable wavelength interference filter 5 to the control board 128. Consequently, a driving voltage applied to the electrostatic actuator 56 of the variable wavelength interference filter 5 is switched. Light having a spectral image pickup wavelength corresponding to the driving voltage (corresponding to a gap dimension between the reflection films 54 and 55) is received from the variable wavelength interference filter 5 by the image pickup section 123. That is, a spectral image corresponding to the spectral image pickup wavelength is acquired (step S7).

The signals from the photoelectric devices 126 of the image pickup section 123 are input to the control section 16 via the control board 128. The module control unit 182 selects a preset signal of the photoelectric device 126 according to the spectral image pickup wavelength among the signals (light amount values) input from the photoelectric devices 126 and acquires a spectral, image.

That is, when incident light is made incident by the variable wavelength interference filter 5, lights having a plurality of peak wavelengths of different orders m are transmitted through the variable wavelength interference filter 5. Light having a peak wavelength in the visible light region other than the spectral image pickup wavelength is sometimes made incident on the image pickup section 123. In this embodiment, in order to eliminate a measurement error due to such light having the peak wavelength in the visible light region, the module control unit 182 selects the photoelectric device 126 on which the light having the peak wavelength in the visible light region is not made incident and acquires a spectral image on the basis of a signal of the selected photoelectric device 126.

Figures 13, 14:
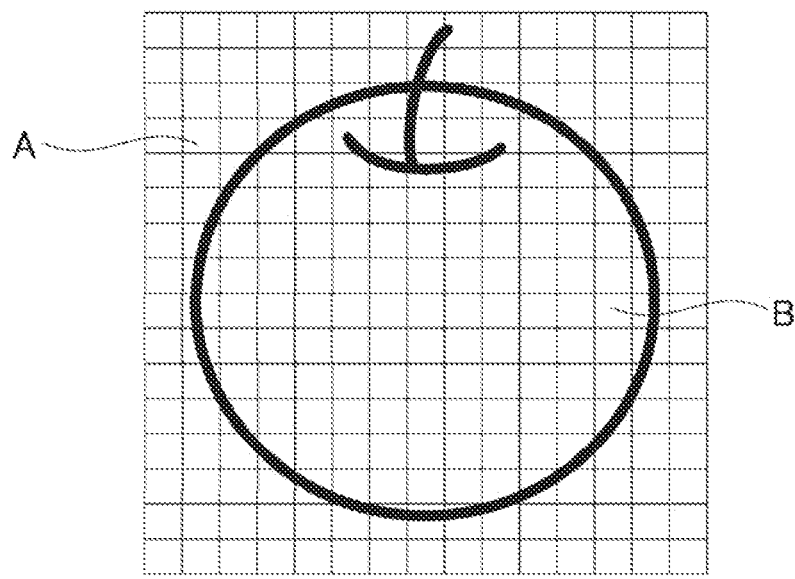
FIG. 13 is a diagram showing a photoelectric device selected according to a spectral image pickup wavelength in the spectrometry apparatus in the first embodiment.
FIG. 14 is a diagram showing an example of a spectral image acquired by the spectrometry apparatus in the first embodiment.

FIG. 13 is a diagram showing the photoelectric devices 126 to be selected with respect to the spectral image pickup wavelength.

In this embodiment, data of types of photoelectric devices to be selected with respect to spectral image pickup wavelengths shown in FIG. 13 are stored in the storing section 17 in advance. The module control unit 182 selects a photoelectric device on the basis of the data.

For example, when light having a spectral image pickup wavelength of 1000 nm is transmitted as light having a first order peak wavelength, light having a wavelength near 500 nm as a second order peak wavelength is simultaneously transmitted through the variable wavelength interference filter 5. In this case, the module control unit 182 selects the R photoelectric device 126R and acquires a spectral image on the basis of a signal value input from the R photoelectric device 126R.

When light having a spectral image pickup wavelength of 700 nm is transmitted, light having a wavelength near 350 nm as a second order peak wavelength is simultaneously transmitted through the variable wavelength interference filter 5. In this case, the module control unit 182 selects the R photoelectric device 126R or the G photoelectric device 126G. In this case, a signal value of one of the R photoelectric device 126R and the G photoelectric device 126G may be adopted. An average of signal values of the R photoelectric device 126F and the G photoelectric device 126G may be adopted.

In step S7, when the module control unit 182 receives the spectral image from the control board 128, the module control unit 182 stores the spectral image pickup wavelength and the spectral image in the storing section 17 in association with each other.

Subsequently, the module control unit 182 determines whether another spectral image not acquired yet is present (step S8). When a spectral image not acquired yet is present in step S8, the spectrometry apparatus 10 returns to step S7 and continues the acquisition processing for a spectral image.

In this embodiment, component amounts of fats, sugars, proteins, and moisture and a calorie are detected. Therefore, as the spectral image pickup wavelength set in step S7, wavelengths at which feature values corresponding to at least fats, sugars proteins, and moisture are obtained only have to be set. In step S8, the module control unit 182 only has to determine whether spectral images having these spectral image pickup wavelengths are acquired.

Nutrients set as measurement targets are not limited to the above. Spectral images having wavelengths at which feature values corresponding to other nutrients may be acquired. Spectral images at a predetermined wavelength interval (e.g., 10 nm interval) may be sequentially acquired. An optical spectrum may be estimated from the spectral images.

As a method of estimating an optical spectrum, for example, a measurement spectrum matrix including light amounts corresponding to a plurality of spectral image pickup wavelengths respectively as matrix elements is generated and a predetermined transformation matrix is caused to act on the measurement spectrum matrix to estimate an optical spectrum of light set as a measurement target. In this case, a plurality of sample lights, optical spectra of which are known, are measured by the image pickup module 12 in advance. The transformation matrix is set such that a deviation between a matrix obtained by causing the transformation matrix to act on a measurement spectrum matrix generated on the basis of a light amount obtained by measurement and a known optical spectrum is minimized.

In the setting of a driving voltage corresponding to the spectral image pickup wavelength in step S7, it is preferable that the spectral image pickup wavelength is corrected using temperature detected by the temperature sensor 13 and a driving voltage corresponding to the corrected spectral image pickup wavelength is acquired. In this case, the module control unit 182 detects temperatures at respective points (pixels of a picked-up image) from a temperature distribution of a measurement target food and corrects spectral image pickup wavelengths on the basis of the detected temperatures.

For example, when a light absorption degree of a wavelength $\lambda_{A0}$ changes according to a content ratio of a component A at a reference temperature $T_0$, a feature value of the component A at the reference temperature $T_0$ is the light absorption degree of the wavelength $\lambda_{A0}$. However, at the temperature $T_1$, a light absorption degree of a wavelength $\lambda_{A1}$ sometimes changes according to the content ratio of the component A. In this case, a feature value of the component A at the temperature $T_1$ is the light absorption ratio of the wavelength $\lambda_{A1}$. In particular, it is known that a change in an absorption spectrum due to a temperature change is large in moisture. In performing an analysis of the components, it is preferable to correct a wavelength at which a feature value is detected.

Therefore, the module control unit 182 reads out correction values corresponding to temperatures of the components stored in the storing section 17, multiplies the wavelength $\lambda_{A0}$ with the correction values, and calculates the wavelength $\lambda_{A1}$ at which feature values are detected with respect to the temperature $T_1$. When temperature is different depending on a part of a test target, the module control unit 182 calculates spectral image pickup wavelengths respectively for temperatures of respective parts of the test target.

Referring back to FIG. 11, when it is determined in step S8 that a spectral image not acquired yet is absent, the component analyzing unit 183 carries out component analysis processing for the image pickup target.

In the component analysis processing, first, the analyzing unit 183B carries out a component analysis of the image pickup target food on the basis of the spectral image obtained in step S7 and calculates component content ratios of components (step S9).

Figure 15:
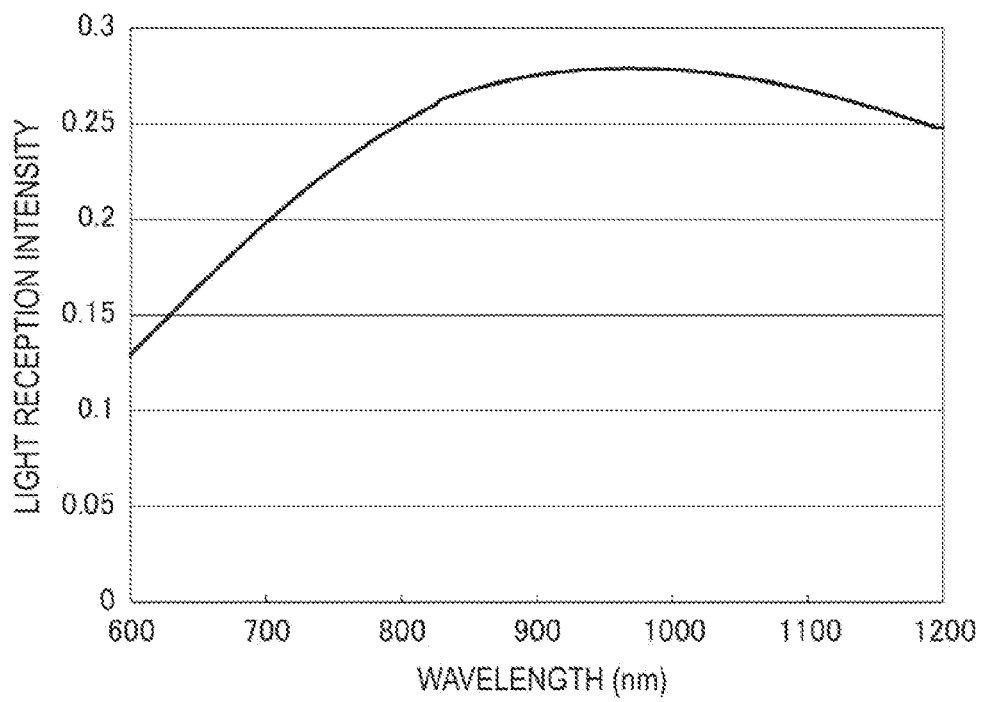
FIG. 15 is a diagram showing an optical spectrum in a pixel A shown in FIG. 14.
Figure 16:
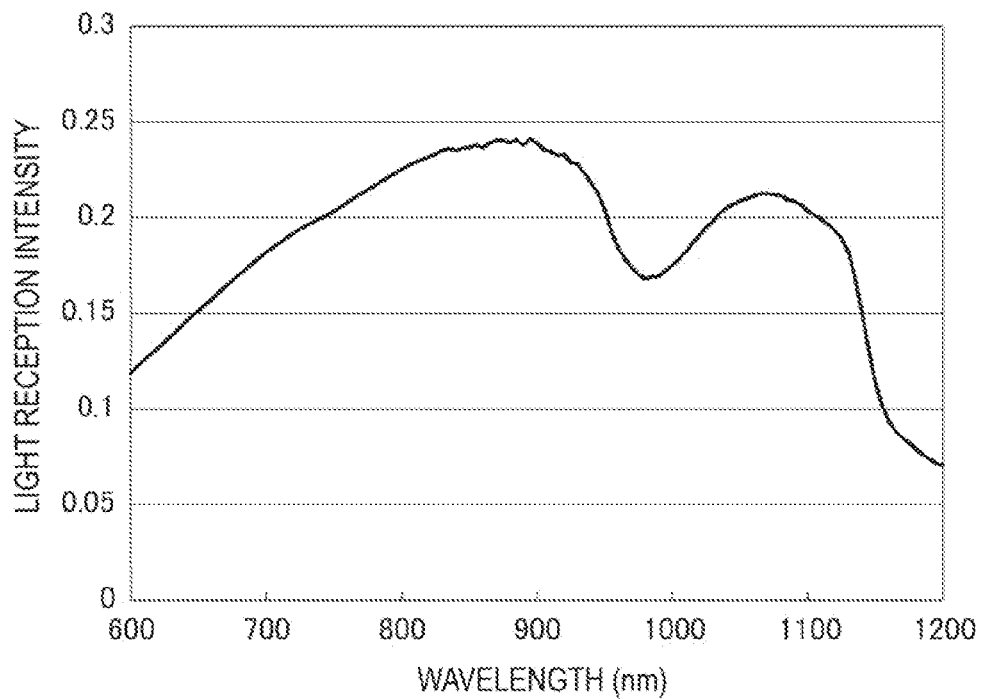
FIG. 16 is a diagram showing an optical spectrum in a pixel B shown in FIG. 14.

FIG. 14 is an example of the acquired spectral image. FIG. 15 is a diagram showing an optical spectrum in a pixel A shown in FIG. 14. FIG. 16 is a diagram showing an optical spectrum in a pixel B shown in FIG. 14. As shown in FIGS. 14 to 16, it is possible to analyze a feature value of an absorption spectrum of light and analyze components contained in the image pickup target food by analyzing optical spectra of pixels on the basis of the acquired spectral image.

Specifically, first, the analyzing unit 183B specifies a pixel range in which the measurement target food is reflected and calculates content ratios of components in the entire measurement target food.

The image pickup target food is specified on the basis of a spectral image or a color image. As a method of specifying the image pickup target food, an image processing technique in the past can be used. For example, the pixel range in which the image pickup target food is reflected is specified by, for example, edge detection in an image. The method of specifying the image pickup target food is not limited to this. For example, when a shape feature value of the image pickup target food is stored in the storing section 17, the image may be analyzed on the basis of the shape feature value to specify the image pickup target food.

The analyzing unit 183B calculates, with respect to the components, an average of content ratios in pixels of the specified image pickup target food and sets the average as a component content ratio in the entire image pickup target food. The analyzing unit 183B may pick up a plurality of pixels from a pixel range of the specified image pickup target food and average component content ratios analyzed with respect to the pixels.

As a method of calculating a content ratio, the analyzing unit 183B calculates a light absorption degree $A_\lambda$ of a wavelength $\lambda$ in the pixels according to Expression (1) below on the basis of, for example, a reference received light amount $I_0$ and a received light amount $I_\lambda$ in pixels of a picked-up spectral image having the wavelength $\lambda$.

$$A_\lambda = -\log(I_\lambda/I_0) \qquad (1)$$

As the reference received light amount $I_0$, a value acquired by the initial processing is used.

Thereafter, the analyzing unit 183B analyzes the content ratios of the components on the basis of the calculated light absorption degree $A_\lambda$ and the correlation data stored in the storing section 17. As a method of analyzing the component content ratios, a chemometrics method used in the past can be used. As the chemometrics method, for example, methods such as a multiple regression analysis, a main component regression analysis, and a partial least square method can be used. Analysis methods employing these chemometrics methods are well-known techniques. Therefore, explanation of the analysis methods is omitted.

Subsequently, the mass estimating unit 183A estimates mass of the image pickup target food (step S10).

In step S10, the mass estimating unit 183A estimates mass of the image pickup target food on the basis of a picked-up image. The picked-up image may be one of acquired spectral images or may be a color image.

In this embodiment, a reference object having a known size is subjected to image pickup together with the image pickup target food. The mass estimating unit 183A compares the size of the reference object and the size of the test target on the basis of the picked-up image to estimate rough volume of the test target.

The estimation of the volume of the test target is not limited to the estimation of the volume using the reference object. For example, the volume of the test target may be estimated by image processing. For example, processing for calculating the volume of the test target through a three-dimensional analysis processing may be performed using picked-up images obtained by picking up the test target from different angles.

The mass estimating unit 183A estimates mass of the image pickup target food from the content ratios of the components analyzed in step SIC and the estimated volume of the image pickup target food.

When a mass measuring section such as an electronic scale is provided in the spectrometry apparatus 10, the mass of the image pickup target food may be measured by the mass measuring section.

Thereafter, the analyzing unit 183B calculates contents of the nutrients on the basis of the mass estimated in step S10 and the content ratios of the components analyzed in step S9. The analyzing unit 183B calculates a calorie of the test target on the basis of Expression (2) from the calculated contents (contents of fats, sugars, and proteins) of the components (step S11).

$$\text{Calorie (kcal)} = \text{fat amount (g)} \times 9 + \text{protein amount (g)} \times 4 + \text{sugar amount (g)} \times 4 \qquad (2)$$

Thereafter, the analyzing unit 183B stores the calculated contents of the nutrients and the calculated calorie in the storing section 17. The display control unit 184 causes the display 14 to display the contents of the components and the calorie calculated in step S11 (step S12).

Action and Effects of the First Embodiment

In the spectrometry apparatus 10 in this embodiment, the state in which the variable wavelength interference filter 5 is located on the optical path L of the incident light and the state in which the variable wavelength interference filter 5 is retracted from the optical path L can be switched by the filter-position switching section 127. Therefore, it is possible to pick up, with the single image pickup section 123, an image in the state in which the variable wavelength interference filter 5 is located on the optical path L of the incident light and an image in the state in which the variable wavelength interference filter 5 is retracted from the optical path L can be picked up. Consequently, it is possible to realize simplification of the configuration and a reduction in the size of the spectrometry apparatus 10.

In this embodiment, the filter-position switching section 127 retracts the spectral filter from the optical path L in the color image pickup mode according to the control by the module control, unit 182 of the control section 16. In this case, incident light is directly made incident on the image pickup section 123 not via the variable wavelength interference filter 5. Since light in the visible wavelength region is subjected to image pickup, it is possible to pick up an appropriate color image. The filter-position switching section 127 moves the spectral filter onto the optical path L in the spectral image pickup mode. In this case, light having a predetermined spectral image pickup wavelength transmitted through the variable wavelength interference filter 5 is made incident on the image pickup section 123. Therefore, it is possible to acquire a spectral image corresponding to the spectral image pickup wavelength.

In this embodiment, the image pickup section 123 includes the image pickup pixel 124 including the three color filters 125 corresponding to the colors of RGB and the three photoelectric devices 126 corresponding to the three color filters 125. When a spectral image is acquired, the module control unit 182 selects the photoelectric device 126 corresponding to the color filter 125 that blocks light having a peak wavelength in the visible wavelength region in an order different from an order corresponding to a spectral image pickup wavelength transmitted by the variable wavelength interference filter 5. The module control unit 182 acquires a spectral image on the basis of a signal value of the selected photoelectric device 126. Therefore, it is possible to pick up a spectral image in which light in the visible wavelength region is cut. It is possible to acquire a highly accurate spectral image.

In this embodiment, as the variable wavelength interference filter 5, the variable wavelength Fabry-Perot etalon is used which changes, with the electrostatic actuator 56, a gap dimension between the fixed reflection film 54 and the movable reflection film 55 to thereby transmit light having a wavelength corresponding to the changed gap dimension. The thickness dimension of the Fabry-Perot etalon can be suppressed, for example, within 1 mm. Therefore, it is possible to realize a reduction in the size of the spectrometry apparatus 10.

Second Embodiment

A second embodiment of the invention is explained with reference to the drawings.

In the example explained in the first embodiment, a spectral image is acquired on the basis of a signal (a light amount value) input from, among the photoelectric devices 126, the photoelectric device 126 that receives light transmitted through the color filter 125 that blocks light having a peak wavelength different from a spectral image pickup wavelength in the variable wavelength interference filter 5. This embodiment is different from the first embodiment in that light in the visible wavelength region is blocked by a visible light blocking filter provided on the optical path L to acquire a spectral image.

Figure 17:
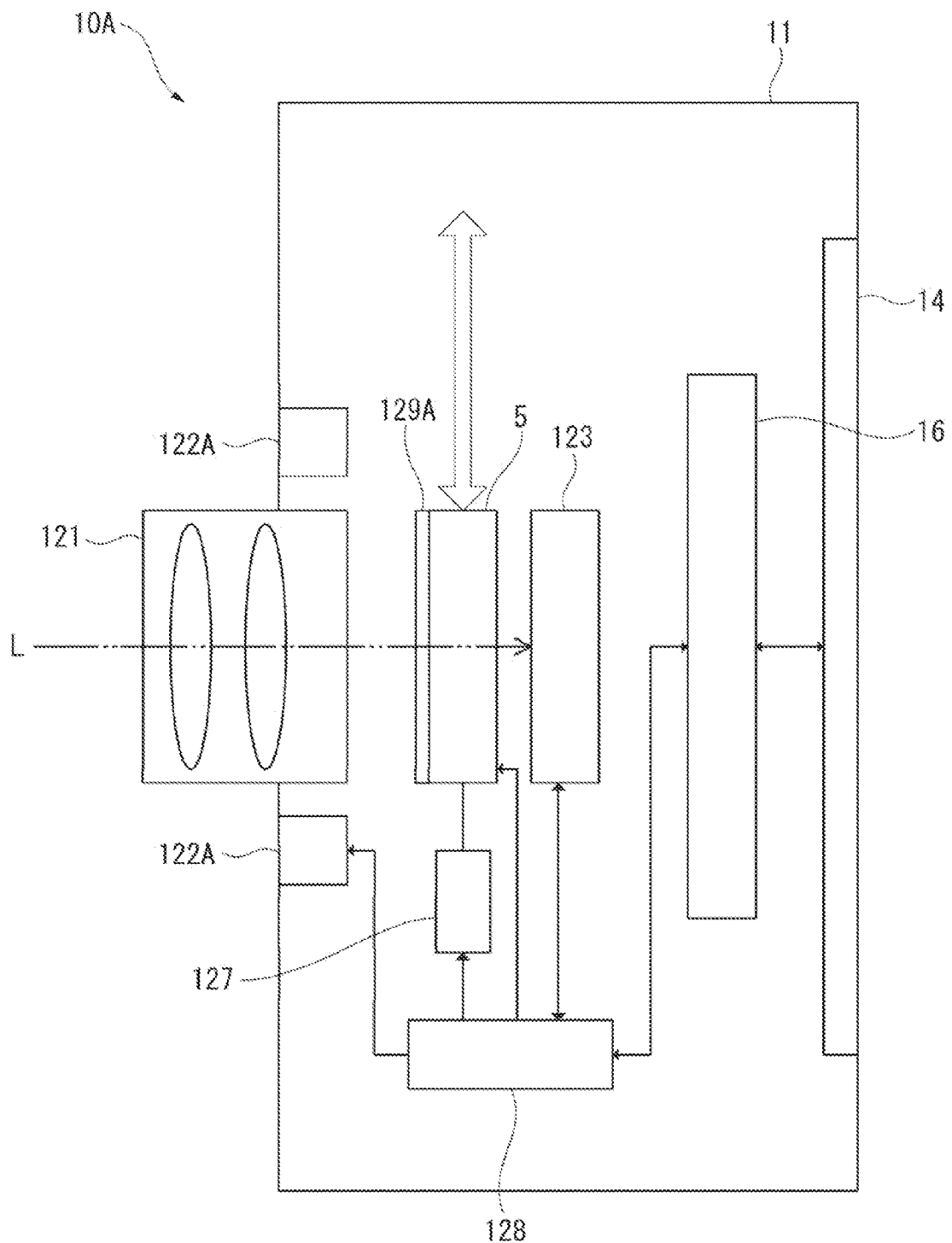
FIG. 17 is a diagram showing the schematic configuration of a spectrometry apparatus in a second embodiment of the invention.

FIG. 17 is a schematic diagram showing the sectional configuration of a spectrometry apparatus 10A in the second embodiment.

As shown in FIG. 17, the spectrometry apparatus 10A in this embodiment includes, in the pre-stage of the variable wavelength interference filter 5, a visible light blocking filter 129A configured to block light in the visible wavelength region and transmit light in the infrared wavelength region.

In an example explained in this embodiment, the visible light blocking filter 129A is provided in the pre-stage of the variable wavelength interference filter 5. However, the visible light blocking filter 129A may be arranged in any position as long as the visible light blocking filter 129A is provided in the pre-stage of the image pickup section 123. For example, the visible light blocking filter 129A may be provided between the variable wavelength interference filter 5 and the image pickup section 123 or may be provided in the light incident section 121.

In this embodiment, the filter-position switching section 127 moves the visible light blocking filter 129A together with the variable wavelength interference filter 5. That is, in the color image pickup mode, the module control unit 182 controls the filter-position switching section 127 to retract the variable wavelength interference filter 5 and the visible light blocking filter 129A from the optical path L. In the spectral image pickup mode, the module control unit 182 controls the filter-position switching section 127 to move the variable wavelength interference filter 5 and the visible light blocking filter 129A onto the optical path L.

The visible light blocking filter 129A may be directly stuck to, for example, a light incident surface or a light emission surface of the variable wavelength interference filter 5. In this case, it is unnecessary to separately provide, as the filter-position switching section 127, a moving mechanism for moving the visible light blocking filter 129A. Therefore, it is possible to realize simplification of the configuration of the spectrometry apparatus 10A.

In the spectrometry apparatus 10A in this embodiment, in the spectral image pickup mode, a method of acquiring a spectral image in step S7 in the first embodiment is different.

In the first embodiment, in order to cut light in a transmission peak wavelength in the visible wavelength region, the photoelectric device 126 is selected according to a spectral image pickup wavelength and a spectral image based on a light amount value output from the selected photoelectric device 126 is acquired.

On the other hand, in this embodiment, it is unnecessary to select the photoelectric device 126. That is, as explained above, in this embodiment, since the visible light blocking filter 129A is arranged on the optical path L together with the variable wavelength interference filter 5 in the spectral image pickup mode, visible light is not made incident on the image pickup section 123. Therefore, for example, any one (e.g., the R photoelectric device 126R) of the R photoelectric device 126R, the G photoelectric device 126G, and the B photoelectric device 126B is used as the photoelectric device 126 for infrared light reception. A spectral image is acquired on the basis of a signal (a light amount value) input from the photoelectric device 126 for infrared light reception.

In the example, any one of the three photoelectric devices 126 (126R, 126G, and 126B) is used as the photoelectric device for infrared light reception. However, a spectral image may be acquired on the basis of, for example, an average, a median, or a total of light amount values of the three photoelectric devices 126 (126R, 126G, and 126B).

Action and Effects of the Second Embodiment

The spectrometry apparatus 10A in this embodiment includes the visible light blocking filter 129A. In the color image pickup mode, the filter-position switching section 127 retracts the visible light blocking filter 129A from the optical path L together with the variable wavelength interference filter 5. Consequently, as in the first embodiment, it is possible to pick up an appropriate color image. On the other hand, in the spectral image pickup mode, the filter-position switching section 127 moves the visible light blocking filter 129A onto the optical path L together with the variable wavelength interference filter 5. In such a configuration, compared with the first embodiment, since the visible light blocking filter 129A is provided, the number of components in the spectrometry apparatus 10A increases and the configuration of the spectrometry apparatus 10A is complicated. However, when a spectral image is acquired, it is unnecessary to select the photoelectric device 126, a light amount value of which is acquired, according to a spectral image pickup wavelength. Therefore, it is possible to acquire a spectral image according to a preset light amount value of one photoelectric device among the three kinds of photoelectric devices 126R, 126G, and 126B. When light in the infrared wavelength region is received as explained above, it is possible to suppress an error due to a difference among transmission characteristics of the color filters 125 (125R, 125G, and 125B) by fixing the photoelectric device. Therefore, it is possible to highly accurately acquire a spectral image.

An average, a total, or the like of light amount values of the three kinds of photoelectric devices 126R, 126G, and 126B may be calculated and adopted as a light amount value. In this case, it is possible to acquire a more highly accurate spectral image.

Third Embodiment

A third embodiment of the invention is explained with reference to the drawings.

In the first and second embodiments, in the color image pickup mode, incident light from the light incident section 121 is directly made incident on the image pickup section 123. This embodiment is different from the first and second embodiments in that light in the infrared wavelength region is blocked by an infrared light blocking filter provided on the optical path L to acquire a color image.

Figure 18:
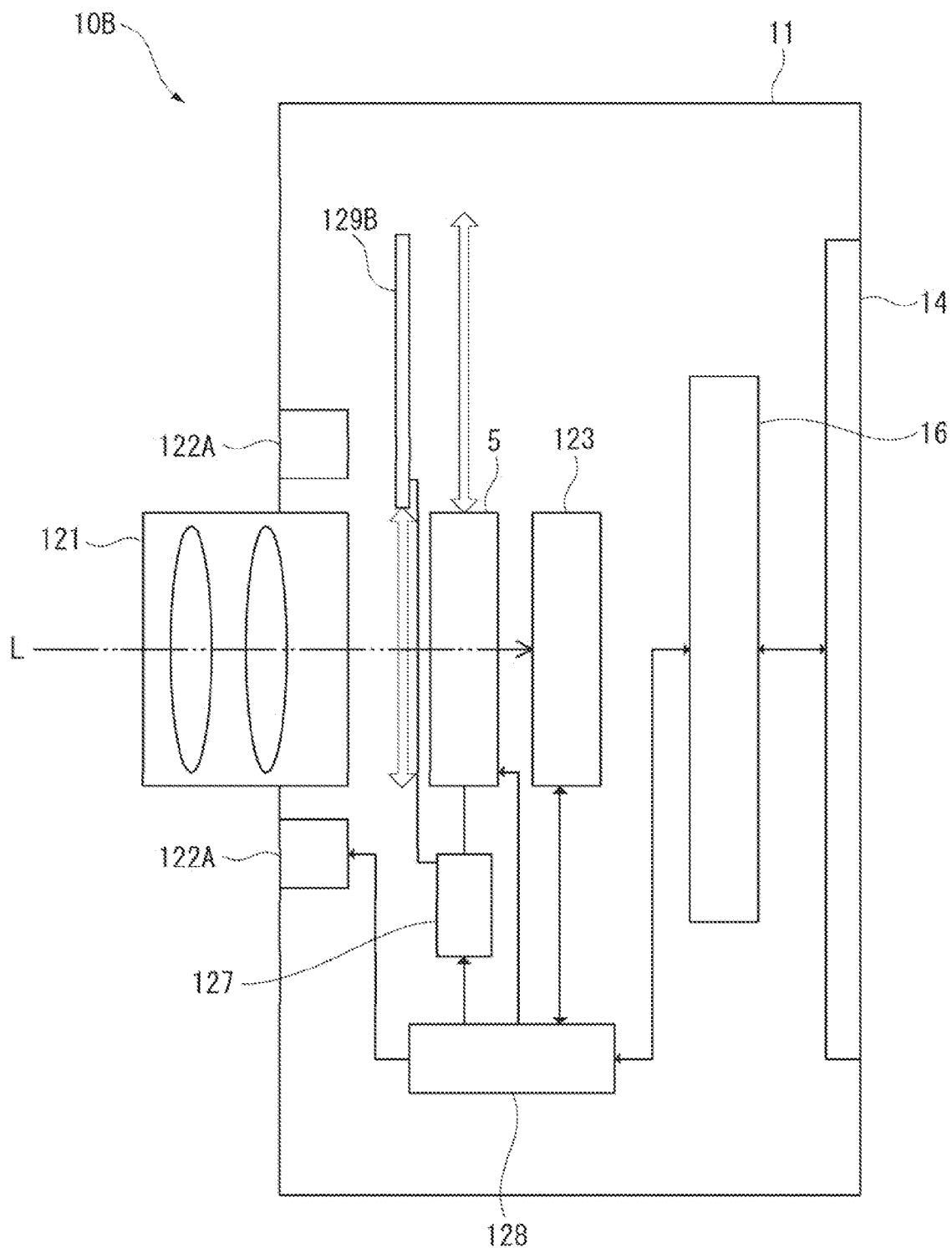
FIG. 18 is a diagram showing the schematic configuration of a spectrometry apparatus in a third embodiment of the invention.

FIG. 18 is a schematic diagram showing the sectional configuration of a spectrometry apparatus 10B in the third embodiment.

As shown in FIG. 18, the spectrometry apparatus 10B in this embodiment includes, on the optical path L, an infrared light blocking filter 129B (a spectral target wavelength light blocking filter) configured to block light in the infrared wavelength region and transmit light in the visible wavelength region.

In an example explained in this embodiment, the infrared light blocking filter 129B is provided in the pre-stage of moving and retracting positions of the variable wavelength interference filter 5 on the optical path L. However, the infrared light blocking filter 129B may be arranged in any position as long as the infrared light blocking filter 129B is provided in the pre-stage of the image pickup section 123.

For example, the infrared light blocking filter 129B may be provided on a surface same as an arrangement surface of the variable wavelength interference filter 5.

In this embodiment, the filter-position switching section 127 moves the infrared light blocking filter 129B together with the variable wavelength interference filter 5. That is, in the color image pickup mode, the module control unit 182 controls the filter-position switching section 127 to retract the variable wavelength interference filter 5 (when the visible light blocking filter 129A is provided as in the second embodiment, the variable wavelength interference filter 5 and the visible light blocking filter 129A) from the optical path L and moves the infrared light blocking filter 129B onto the optical path L. In the spectral image pickup mode, the module control unit 182 controls the filter-position switching section 127 to move the variable wavelength interference filter 5 (when the visible light blocking filter 129A is provided as in the second embodiment, the variable wavelength interference filter 5 and the visible light blocking filter 129A) onto the optical path L and retracts the infrared light blocking filter 129B from the optical path L.

Action and Effects of the Third Embodiment

The spectrometry apparatus 10B in this embodiment includes the infrared light blocking filter 129B. In the color image pickup mode, the filter-position switching section 127 retracts the variable wavelength interference filter 5 from the optical path L and moves the infrared light blocking filter 129B onto the optical path L. In such a configuration, compared with the first embodiment, since the infrared light blocking filter 129B is provided, the number of components in the spectrometry apparatus 10B increases and the configuration of the spectrometry apparatus 10B is complicated. However, when a color image is acquired, since light in the infrared wavelength region is blocked, a light amount value of the light in the infrared wavelength region is not added. Therefore, it is possible to acquire a color image based on an accurate light amount value of visible light.

Other Embodiments

The invention is not limited to the embodiments explained above. Modifications, improvements, and the like within a range in which the object of the invention can be attained are included in the invention.

For example, in the embodiments, the examples of the spectrometry apparatuses 10, 10A, and 10B are explained. However, the invention can also be applied to a normal spectroscopic camera that does not carry out, for example, a component analysis of an image pickup target.

The examples of the spectrometry apparatuses 10, 10A, and 10B that analyze components of a food are explained. However, the invention can also be applied to an apparatus that carries out a component analysis of other substances.

In the example explained in the embodiments, the target wavelength region of a spectral image according to the invention is set in the infrared wavelength region and a spectral image in the infrared wavelength region is acquired. However, the target wavelength region may be set in, for example, an ultraviolet wavelength region. In this case, as in the embodiments, the variable wavelength interference filter 5 is enabled to be advanced to and retracted from the optical path L by the filter-position switching section 127. Consequently, it is possible to appropriately acquire a color image and a spectral image in the ultraviolet wavelength region. In this case, as the color filters 125 of the image pickup section 123, an R color filter capable of transmitting lights in the red wavelength region and the ultraviolet wavelength region, a G color filter capable of transmitting lights in the green wavelength region and the ultraviolet wavelength region, and a B color filter capable of transmitting lights in the blue wavelength region and the ultraviolet wavelength region are used.

The invention can also be applied to a spectroscopic camera that acquires a spectral image in the visible wavelength region. In this case, with a configuration same as the configuration of the spectrometry apparatus 10 in the first embodiment, it is possible to acquire a color image and spectral images in the visible wavelength region. In the second embodiment, a band-pass filter (e.g., the infrared light blocking filter 129B) that blocks lights in wavelength regions other than the visible wavelength region is used instead of the visible light blocking filter 129A. Consequently, it is possible to block lights having wavelengths other than visible light and pick up a highly accurate spectral image. Further, the infrared light blocking filter 129B in the third embodiment may be fixed on the optical path L (not moved by the filter-position switching section 127). In this case, as in the third embodiment, it is possible to pick up a highly accurate color image in which light in the infrared wavelength region is cut. Further, even during image pickup of a spectral image in the visible wavelength region, it is possible to cut light in the infrared wavelength region and acquire a highly accurate spectral image.

In the example explained in the embodiments, the variable wavelength interference filter 5 is held by the filter holding section or the like and can be advanced to and retracted from the optical path L. However, the variable wavelength interference filter 5 may be housed in a housing and then held by the filter holding section.

In this case, by sealing the housing in a vacuum, it is possible to improve driving responsiveness to application of a voltage to the electrostatic actuator 56 of the variable wavelength interference filter 5.

The variable wavelength interference filter 5 includes the electrostatic actuator 56 configured to vary the gap dimension between the reflection films 54 and 55 according to voltage application. However, the variable wavelength interference filter 5 is not limited to this.

For example, a dielectric actuator may be used in which a first dielectric coil is arranged instead of the fixed electrode 561 and a second dielectric coil or a permanent magnet is arranged instead of the movable electrode 562.

Further, a piezoelectric actuator may be used instead of the electrostatic actuator 56. In this case, for example, a lower electrode layer, a piezoelectric film, and an upper electrode layer are laminated and arranged in the holding section 522. A voltage applied between the lower electrode layer and the upper electrode layer is varied as an input value. Consequently, it is possible to expand and contract the piezoelectric film and bend the holding section 522.

In the embodiments, as the Fabry-Perot etalon, the variable wavelength interference filter 5 is illustrated in which the fixed substrate 51 and the movable substrate 52 are joined in a state in which the substrates are opposed to each other, the fixed reflection film 54 is provided on the fixed substrate 51, and the movable reflection film 55 is provided on the movable substrate 52. However, the variable wavelength interference filter 5 is not limited to this.

For example, the fixed substrate 51 and the movable substrate 52 may be not joined. A gap changing section configured to change an inter-reflection film gap such as a piezoelectric device may be provided between the substrates.

The variable wavelength interference filter 5 is not limited to the configuration including the two substrates. For example, a variable wavelength interference filter may be used in which two reflection films are laminated on one substrate via a sacrifice layer and the sacrifice layer is removed by etching or the like to form a gap.

As the spectral filter, for example, an AOTF (Acousto Optic Tunable Filter) or an LCTF (Liquid Crystal Tunable Filter) may be used. However, in this case, a reduction in the size of the spectroscopic camera (the spectrometry apparatuses 10, 10A, and 10B) is likely to be difficult. Therefore, it is desirable to use the Fabry-Perot etalon as the spectral filter.

In the embodiment, the spectroscopic camera includes the temperature sensor 13. The spectroscopic camera corrects, on the basis of detected temperature, a wavelength at which a feature value of an analysis target component can be acquired and obtains a spectral image pickup wavelength.

On the other hand, the temperature sensor 13 may be not provided. Even in this case, for a component having a small change in an absorption spectrum due to temperature, it is possible to carry out a component analysis with a small error.

Besides, a specific structure in carrying out the invention can be appropriately changed to other structures and the like within a range in which the object of the invention can be attained.

The entire disclosure of Japanese Patent Application No. 2013-032937 filed on Feb. 22, 2013 is expressly incorporated by reference herein.

What is claimed is:

1. A spectroscopic camera comprising:
an incident optical system on which incident light from an image pickup target is made incident;
a spectral filter configured to select light having a predetermined wavelength from the incident light input from the incident optical system and capable of changing the wavelength of the light to be selected;
a filter-position switching section configured to advance and retract the spectral filter on an optical path of the incident light; and
an image pickup section configured to receive, with the filter-position switching section, directly or via the spectral filter, the incident light input from the incident optical system, the spectral filter being located between the incident optical system and the image pickup section, the image pickup section being disposed on an optical axis of the incident optical system.

2. The spectroscopic camera according to claim 1, wherein the filter-position switching section retracts the spectral filter from the optical path when an image in a visible wavelength region is picked up and moves the spectral filter onto the optical path when a spectral image is picked up.

3. The spectroscopic camera according to claim 1, wherein
the image pickup section includes a filter configured to transmit light in a target wavelength region of a spectral image and light in a predetermined wavelength range in a visible wavelength region and block other lights, and
the filter includes a plurality of kinds of color filters respectively having different transmission wavelength ranges in the visible wavelength region.

4. The spectroscopic camera according to claim 3, wherein
the target wavelength region of the spectral image is an infrared wavelength region or an ultraviolet wavelength region, and
the color filter is an R color filter, the transmission wavelength range of which is a red wavelength region, a G color filter, the transmission wavelength range of which is a green wavelength region, and a B color filter, the transmission wavelength range of which is a blue wavelength region.

5. The spectroscopic camera according to claim 3, further comprising an image acquiring section configured to acquire a picked-up image, wherein
the spectral filter is a Fabry-Perot etalon, and
when the spectral image in the target wavelength region is picked up, the image acquiring section acquires the spectral image on the basis of a signal input from a photoelectric device corresponding to a color filter, in the visible wavelength region of which a peak wavelength of a transmission spectral in the spectral filter not included in the target wavelength region of the spectral image is not included, among a plurality of photoelectric devices of image pickup pixels.

6. The spectroscopic camera according to claim 1, further comprising a visible light blocking filter configured to block light in a visible wavelength region and transmit light in a target wavelength region of a spectral image, the visible light blocking filter being provided on the optical path between the incident optical system and the image pickup section, wherein
the filter-position switching section retracts the visible light blocking filter from the optical path when an image in the visible wavelength region is picked up and moves the visible light blocking filter onto the optical path when the spectral image in the target wavelength region is picked up.

7. The spectroscopic camera according to claim 1, further comprising a spectral target wavelength light blocking filter configured to transmit light in a visible wavelength region and block light in a target wavelength region of a spectral image, wherein
the filter-position switching section retracts the spectral target wavelength light blocking filter from the optical path when the spectral image in the target wavelength region is picked up and moves the spectral target wavelength light blocking filter onto the optical path when an image in the visible wavelength region is picked up.

\* \* \* \* \*